(12) United States Patent
Bissell et al.

(10) Patent No.: US 11,551,666 B1
(45) Date of Patent: Jan. 10, 2023

(54) NATURAL LANGUAGE PROCESSING

(71) Applicant: Amazon Technologies, Inc., Seattle, WA (US)

(72) Inventors: Anthony Bissell, Somerville, MA (US); Reda Yacouby, Cambridge, MA (US); Cedric Warny, Cambridge, MA (US); Emma Rose Hathaway, Plympton, MA (US); Dustin Edward Axman, Somerville, MA (US)

(73) Assignee: Amazon Technologies, Inc., Seattle, WA (US)

( * ) Notice: Subject to any disclaimer, the term of this patent is extended or adjusted under 35 U.S.C. 154(b) by 386 days.

(21) Appl. No.: 16/885,392

(22) Filed: May 28, 2020

(51) Int. Cl.
*G10L 15/06* (2013.01)
*G10L 15/18* (2013.01)
*G10L 15/26* (2006.01)

(52) U.S. Cl.
CPC ............ *G10L 15/063* (2013.01); *G10L 15/18* (2013.01); *G10L 15/26* (2013.01)

(58) Field of Classification Search
CPC ........ G10L 15/063; G10L 15/18; G10L 15/26
USPC ......................................................... 704/235
See application file for complete search history.

(56) References Cited

U.S. PATENT DOCUMENTS

| | | | | |
|---|---|---|---|---|
| 9,202,464 B1* | 12/2015 | Senior | ................ | G06N 3/08 |
| 10,388,272 B1* | 8/2019 | Thomson | ................ | G10L 15/22 |
| 11,043,208 B1* | 6/2021 | Michelin | ................ | G06N 20/00 |
| 11,410,657 B2* | 8/2022 | Kim | ................ | G06N 20/00 |
| 2006/0136205 A1* | 6/2006 | Song | ................ | G06K 9/6277 704/243 |
| 2006/0195321 A1* | 8/2006 | Deligne | ................ | G10L 15/065 704/E15.009 |
| 2006/0277033 A1* | 12/2006 | Gao | ................ | G10L 15/197 704/10 |
| 2008/0114564 A1* | 5/2008 | Ihara | ................ | G06F 16/35 702/158 |
| 2015/0120289 A1* | 4/2015 | Lev-Tov | ................ | G10L 15/01 704/231 |
| 2015/0371633 A1* | 12/2015 | Chelba | ................ | G10L 15/063 704/240 |
| 2016/0307564 A1* | 10/2016 | Sethy | ................ | G10L 15/16 |
| 2017/0040016 A1* | 2/2017 | Cui | ................ | G10L 15/02 |
| 2018/0261213 A1* | 9/2018 | Arik | ................ | G06N 3/0445 |
| 2019/0175011 A1* | 6/2019 | Jensen | ................ | G06T 7/70 |
| 2020/0074993 A1* | 3/2020 | Lee | ................ | G06F 3/048 |
| 2020/0152173 A1* | 5/2020 | Smith | ................ | G06N 3/084 |
| 2020/0167427 A1* | 5/2020 | Filoti | ................ | G10L 15/16 |
| 2020/0175961 A1* | 6/2020 | Thomson | ................ | G10L 15/28 |
| 2020/0243094 A1* | 7/2020 | Thomson | ................ | H04M 3/42382 |
| 2020/0388271 A1* | 12/2020 | Dunn | ................ | G06Q 30/0281 |
| 2021/0082424 A1* | 3/2021 | Johnson | ................ | G10L 15/22 |
| 2021/0174786 A1* | 6/2021 | Yun | ................ | G10L 15/20 |

(Continued)

*Primary Examiner* — Thuykhanh Le
(74) *Attorney, Agent, or Firm* — Pierce Atwood LLP

(57) ABSTRACT

Example embodiments provide techniques for configuring a natural-language processing system to perform a new function given at least one sample invocation of the function. The training data consisting of the sample invocation may be augmented by determining which subset of available training data most closely resembles the sample invocation and/or function. The effect of re-training a component this this augmented training data may be determined, and an annotator may review any annotations corresponding to the invocation if the effect is large.

20 Claims, 13 Drawing Sheets

(56) References Cited

U.S. PATENT DOCUMENTS

2021/0193118 A1* 6/2021 Lee .................... G10L 19/06
2021/0294975 A1* 9/2021 Xu ..................... G06N 3/08

* cited by examiner

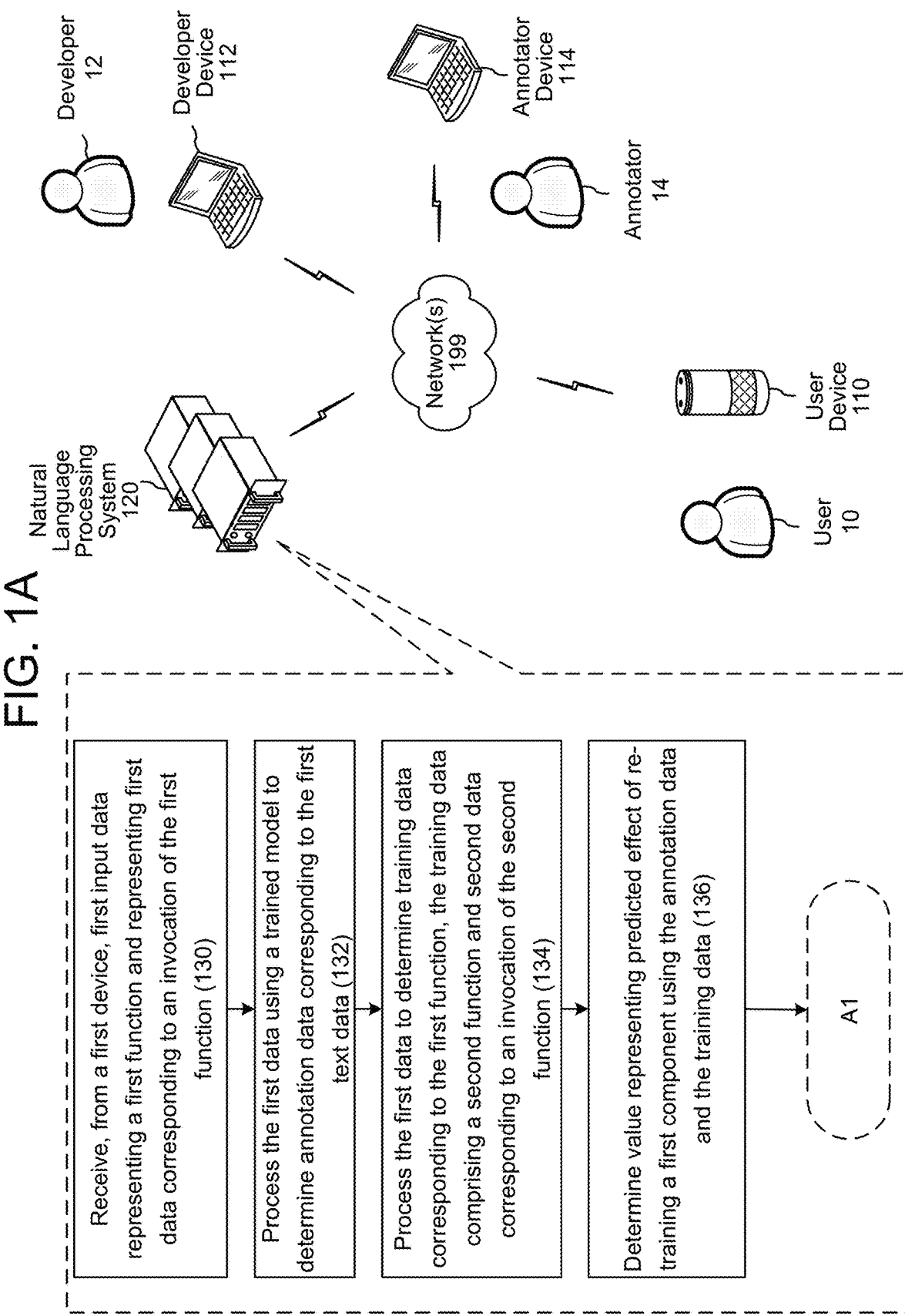

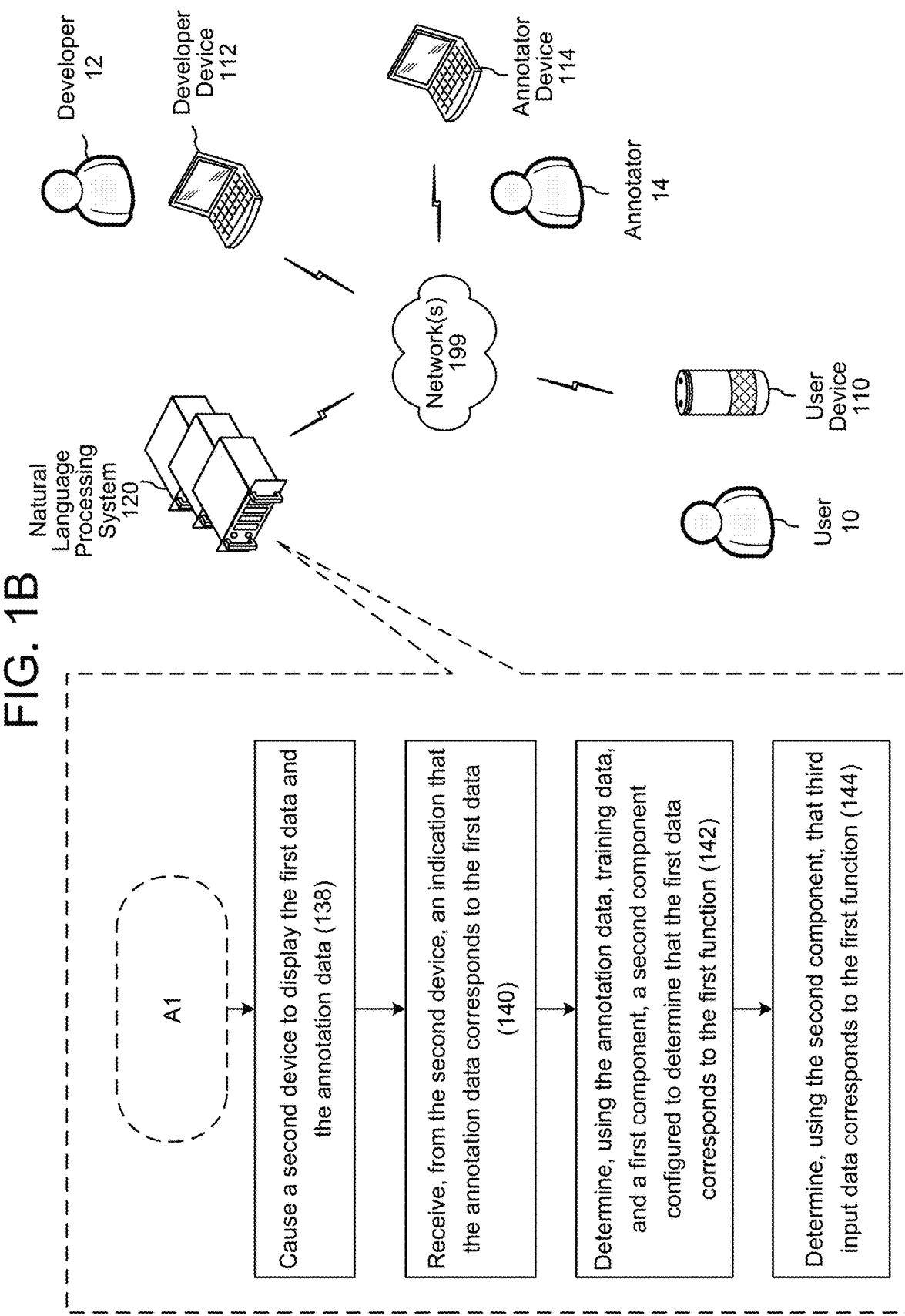

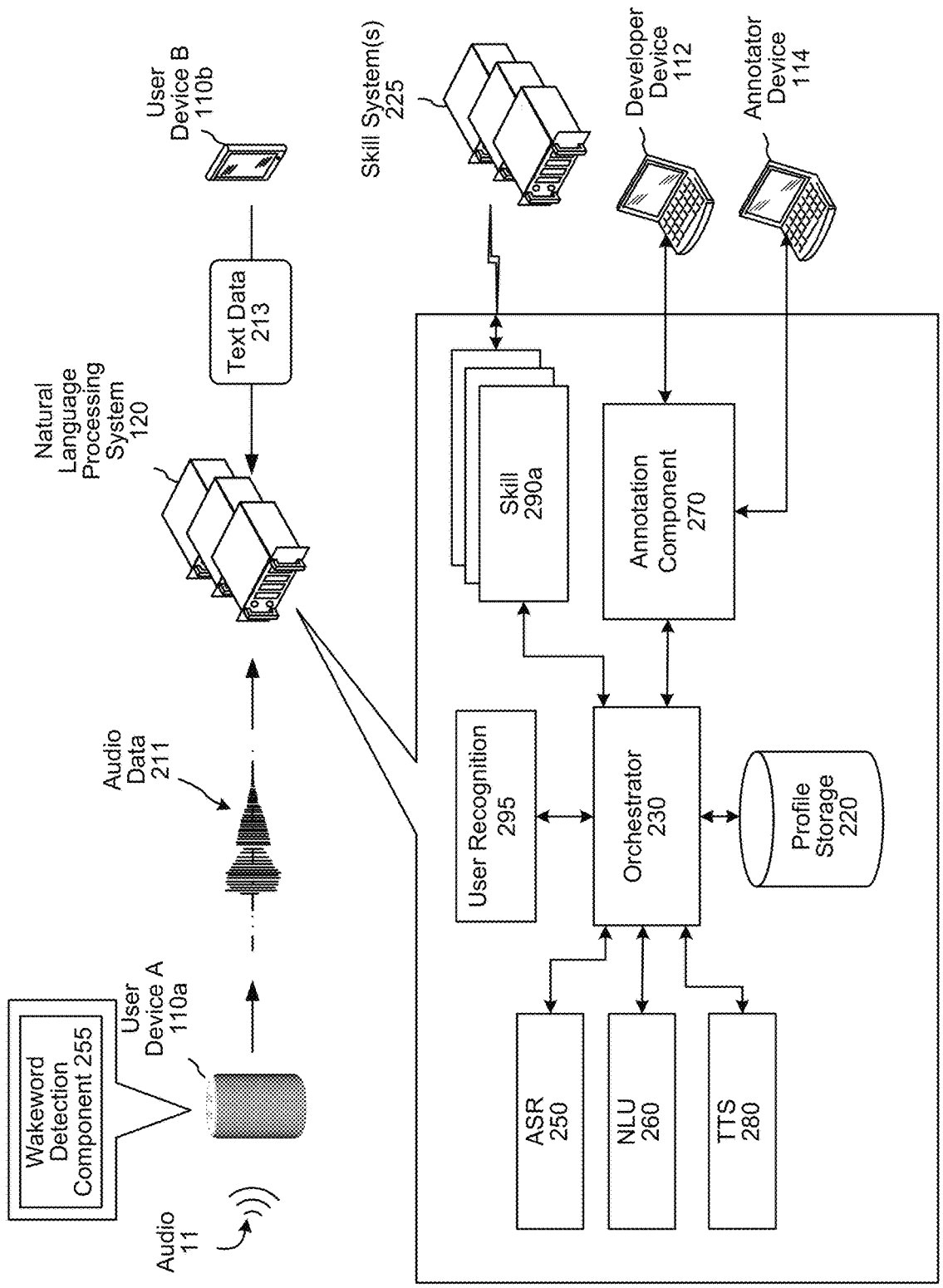

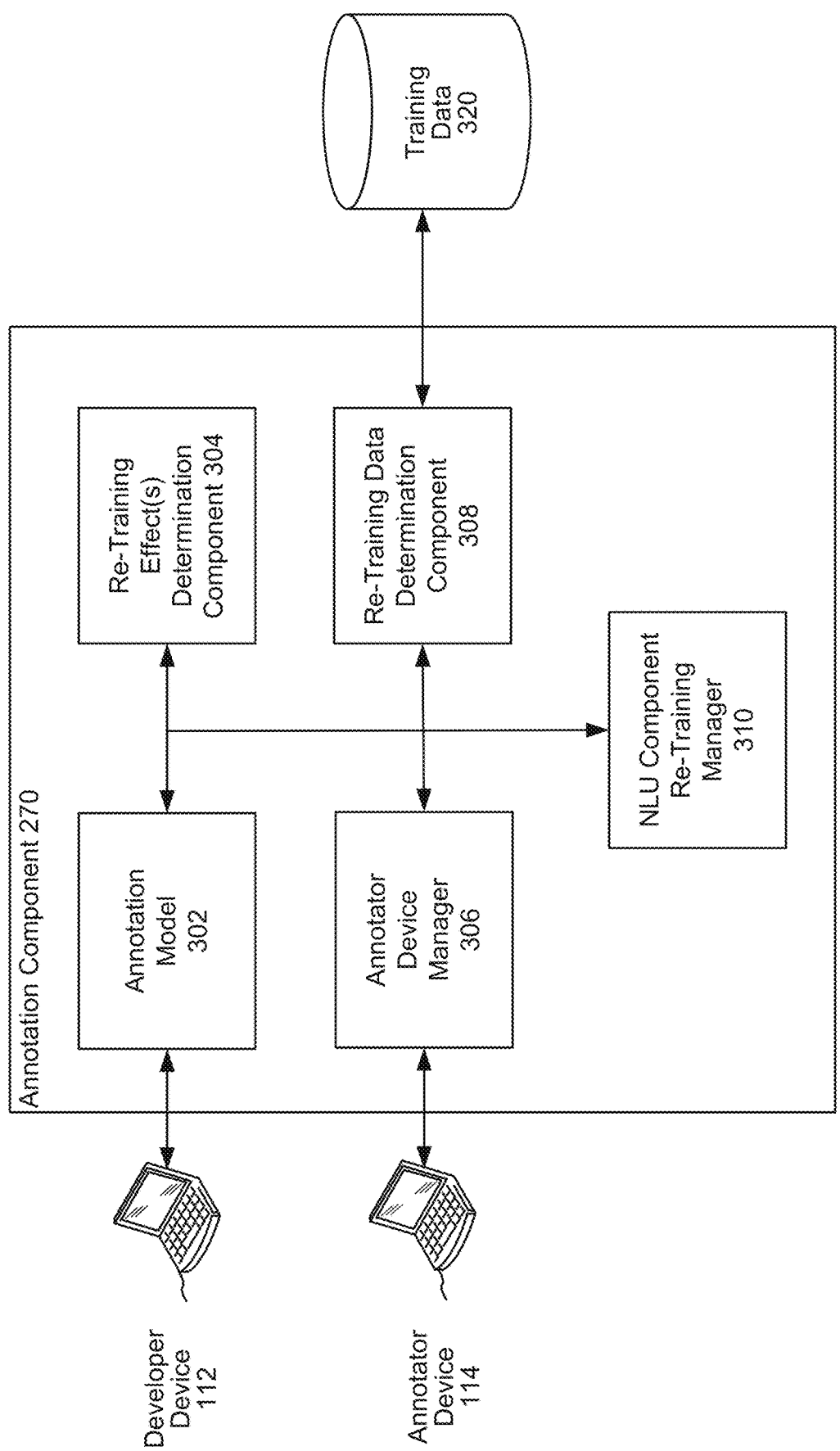

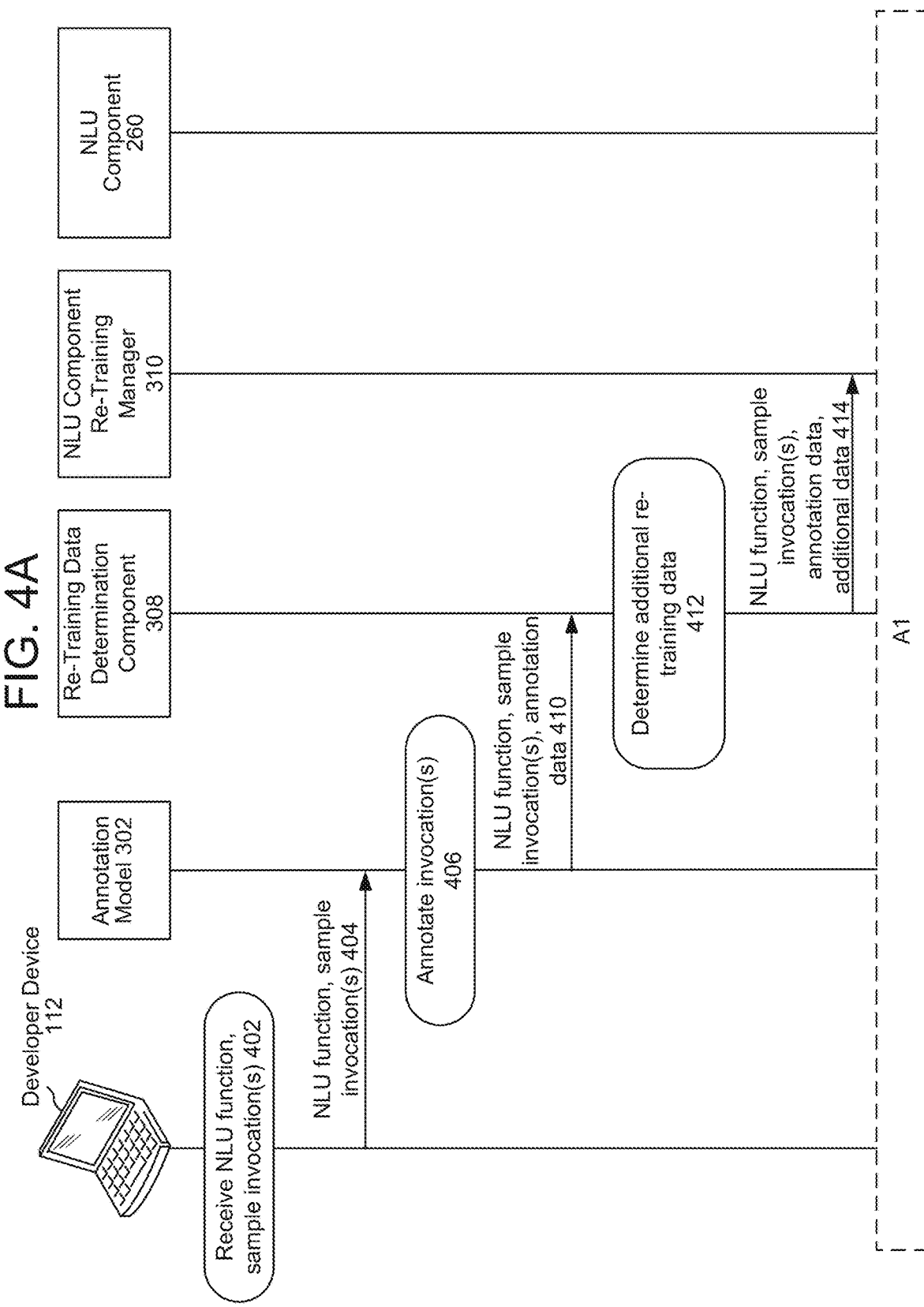

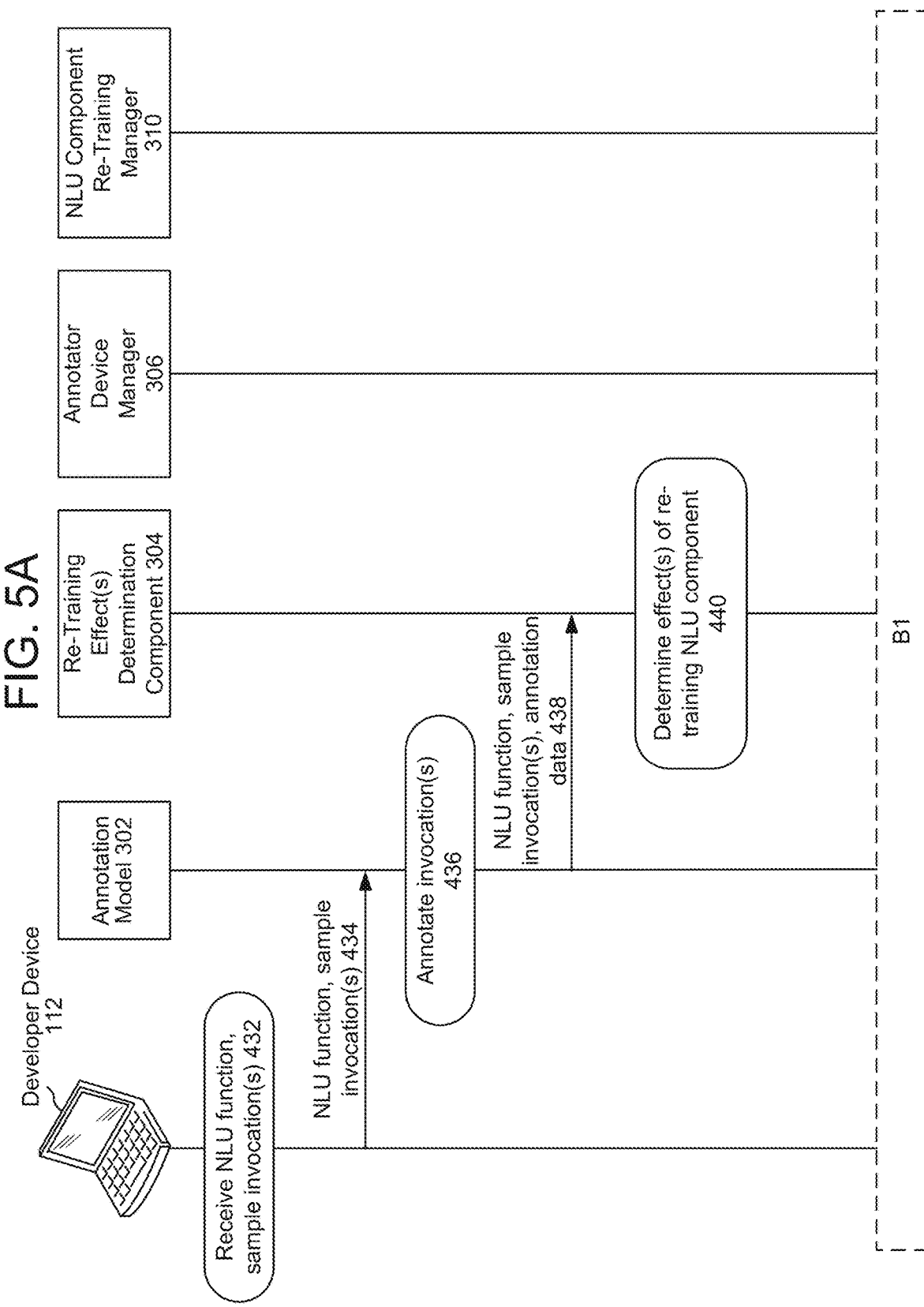

NATURAL LANGUAGE PROCESSING

BACKGROUND

Speech-recognition systems allow humans to interact with computing devices using their voices. Such systems employ techniques to identify words spoken by a human user based on various qualities of a received audio input. Speech-recognition techniques, combined with natural-language understanding techniques, enable speech-based user control of a computing device and may thus allow the device to perform tasks based on the user's spoken commands. The combination of speech-recognition processing and natural-language understanding processing techniques is referred to herein as speech processing. Speech processing may be used by computers, hand-held devices, telephone computer systems, kiosks, and a wide variety of other devices to improve human-computer interaction.

BRIEF DESCRIPTION OF DRAWINGS

For a more complete understanding of the present disclosure, reference is now made to the following description taken in conjunction with the accompanying drawings.

FIGS. 1A and 1B illustrate a system for annotating data in accordance with embodiments of the present disclosure.

FIG. 2 illustrates components of a natural-language processing system in accordance with embodiments of the present disclosure.

FIG. 3 illustrates components for performing annotation of data in accordance with embodiments of the present disclosure.

FIGS. 4A, 4B, 5A, and 5B illustrate process flows for performing annotation of data in accordance with embodiments of the present disclosure.

DETAILED DESCRIPTION

Figure 4B:
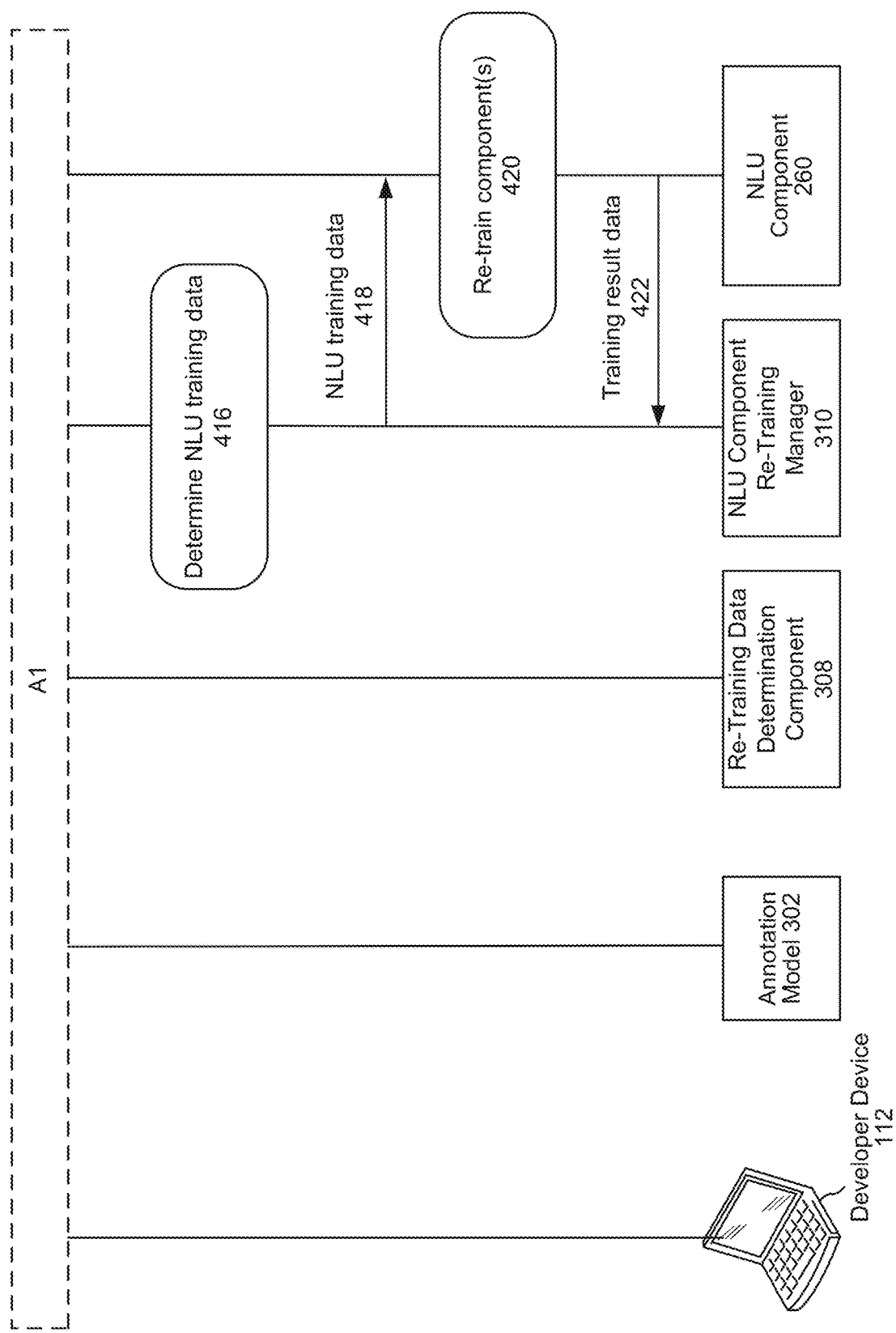

Automatic-speech recognition (ASR) is a field of computer science, artificial intelligence, and linguistics related to transforming audio data that includes a representation of speech into text or other data representative of that speech. Similarly, natural-language understanding (NLU) is a field of computer science, artificial intelligence, and linguistics related to enabling computers to derive meaning from text input containing natural language. ASR and NLU are often used together as part of a speech processing system. A natural-language generation (NLG) system may process the output of an NLU system to generate text or other data representing a natural-language response to a user input. Text-to-speech (TTS) is a field of concerning transforming textual or other meaning representation data output from an NLG system into audio data that is synthesized to resemble human speech.

A speech-processing system may be configured to perform a function in response to natural-language user inputs. For example, for the user input of "play Clash music," a system may output music performed by a band named The Clash. As another example, for the user input of "turn on the lights," a speech-processing system may turn on a light associated with the user's profile.

To respond to such natural-language user inputs, a speech-processing system may implement one or more NLU model(s) configured to perform one or more NLU operations such as intent classification, entity recognition, or others, such as those described below. As used herein, a "skill," and derivations thereof, may refer to software, running on a speech-processing system, that is akin to a software application running on a traditional computing device. That is, a skill may enable a system to execute specific functionality in order to provide corresponding output data. Example skills may include weather information skills, music playing skills, or the like. While "skill" and derivatives thereof may be used herein, the functionality described herein as a skill may be referred to using many different terms, such as an action, bot, app, or the like.

As used herein, a "domain," and derivatives thereof, may refer to a grouping of like functionality provided by the system. Example domains include smart home, music, video, flash briefing, shopping, and custom (e.g., functionality that is not associated with any pre-configured domain). Multiple skills may be associated with a domain. For example the music domain may include skills like Pandora, Spotify, etc. In another example the Shopping domain may include skills corresponding to various retailers and other entities that provide items for purchase. An NLU model may be associated with a domain and may be configured to process user inputs relating to the particular domain by incorporating words that are likely to be used with respect to the particular domain. During runtime system operation, when the system evaluates a user input, an NLU model may generate a representation of a natural language user input, where the representation may be further processable by a corresponding skill to perform an action to output data or perform some other functionality (e.g., output weather data, play a song, turn on lights, etc.).

A developer machine may wish to cause configuration of a speech-processing system such that the system is capable of performing functions not previously implemented and/or can perform the previously implemented functions in an improved manner (e.g., better accuracy, more cost effective, using fewer system resources, produces results faster, etc.). For example, a given speech-processing system may be capable of performing certain functions, such as outputting a weather forecast in response to the user input, "What is the weather going to be today?," but may not be capable of performing other weather-related functions, such as "is today a good day to go sailing on the bay," or performing unrelated functionality like rolling down a car window in response to the user input, "Roll down my window." A developer machine may provide, to a maintainer component of the speech-processing system, data corresponding to the desired function, such as a description of the desired output of the function and one or more sample invocations of the function. For example, the function may specify a domain ("automotive control"), an intent ("lower window"), and/or one or more entities ("driver door window motor"). The corresponding sample invocations may be, for example, "roll down my window," "open my window," and/or "give me some air."

The maintainer component of the speech processing system may then re-train or otherwise update one or more NLU components to process input data to recognize the appropriate invocations, to associate the new, previously-unrecognized invocations with the corresponding function(s), and to cause the system to output an appropriate response. This process may require that NLU data corresponding to the sample invocations, such as a domain, intent, and/or entity, be identified for each invocation and associated with the appropriate invocations in a process referred to herein as "annotation." That is, the data corresponding to the invocation may be associated with metadata corresponding to the input data.

This process of annotation may, however, require or otherwise be improved with human interaction, even if minimal. The speech-processing system may, for example, send the desired new function and/or sample invocations to a device associated with a human annotator. The speech-processing system may cause a display of the device to output the function and/or invocations. The human annotator may input the appropriate annotations and return data to the speech-processing system that includes the determined annotations. The speech-processing system may then re-train the one or more NLU components using the function(s), invocation(s), and/or annotation(s).

Reliance on a human annotator may, however, be improved. The present disclosure provides an improved speech-processing system that reduces with a goal of eliminating the need for human annotation. Referring to FIGS. 1A and 1B, the natural-language processing system 120 receives (130), from a first device, first input data representing a first function (e.g., an NLU function, an ASR function, and/or other function) and representing first data (which may be text, video, and/or audio data) corresponding to an invocation of the first function. The NLU function may be, for example, causing a certain output upon recognition of a certain input. The ASR function may be, for example, causing output of a particular spelling of an input word. The first device may be the developer device 112. The first data may include more than one function and may include more than one invocation. For example, the invocations (which may be text data, audio data, or other data) may include a range of variations in how the function may be invoked. E.g., if the function is lowering a car window, the invocations may include "lower the window" and "give me some fresh air."

The natural-language processing system 120 may then process (132) the first data using a trained model to determine annotation data corresponding to the first data. The trained model may be an annotation model, and the annotation data may be, for example, text or other data representing a domain, intent, and/or entity associated with the function and/or invocation. The trained model may also output a confidence value representing a degree of confidence that the determined annotation data accurately represents the NLU function and/or invocation.

The natural-language processing system 120 may then process (134) the first data to determine training data corresponding to the first function, the training data comprising a second NL function and second data corresponding to an invocation of the second function. As described in greater detail below, the system 120 may encode the first text data using a sentence encoder and compare similarly encoded training data to find most-similar training data.

The natural-language processing system 120 may then determine (136) a value representing a predicted effect of re-training a first component using the annotation data and the training data. As described in greater detail below, this effect may stem from a degree of difference in the model before and after re-training, a number of other functions that may be changed based on the annotation data, and/or a number of user devices 110 affected by the re-trained model. If this value satisfies a condition (e.g., exceeds a threshold), the system 120 may cause (138) a second device to display the first data and the annotation data and then receive (140), from the second device, an indication that the annotation data corresponds to the first data. E.g., the second device may be used to confirm that the annotation data correctly reflects the first data.

The natural-language processing system 120 may then determine (142), using the annotation data, training data, and the first component, a second component configured to determine that the first data corresponds to the first function. The natural-language processing system 120 may then determine (144), using the second component, that third data corresponds to the first function. The third data may be received and/or determined from data received from the user device 110. In other words, the natural-language processing system 120 uses the re-trained second component to recognize invocations corresponding to the new function in later-received input data from the user device 110.

FIG. 2 illustrates various runtime components of the natural-language processing system 120. As described in greater detail below, the system 120 may include an annotation component 270 for receiving input from a developer device 112, determining one or more annotations corresponding to the input, and re-training an NLU component 260 accordingly. The annotation component 270 may, in some embodiments, send annotation data to an annotator device 114 for confirmation and/or update thereof. In some embodiments, the annotation component 270 may instead or in addition determine additional training data to augment the data received from the developer device 112.

As shown in FIG. 2, certain components such as skill components 290 are disposed on the natural-language processing system 120. The present disclosure is not, however, limited to only this distribution of components, and some or all of the depicted components may be disposed on other systems 120 and/or on the user device 110 and/or other user devices 110, such as a voice-controlled device or hub device.

If the components are distributed between user device(s) 110 and/or system(s) 120, communication between various components may occur directly or across a network(s) 199. An audio capture component(s) of a user device A 110a, such as a microphone or array of microphones of the device 110a, captures audio 11. The device 110a processes audio data, representing the audio 11, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110*a* may use a wakeword-detection component 255 to perform wakeword detection to determine when a user intends to speak an input to the natural-language processing system 120. An example wakeword is "Alexa." Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword-detection component 255 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword-detection component 255 may be built on deep neural network (DNN) / recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110*a* may "wake" and begin transmitting audio data 211, representing the audio 11, to the natural-language processing system 120. The audio data 211 may include data corresponding to the wakeword, or the device 110*a* may remove the portion of the audio corresponding to the wakeword prior to sending the audio data 211 to the natural-language processing system 120.

An orchestrator component 230 may receive the audio data 211. The orchestrator component 230 may include memory and logic that enables the orchestrator component 230 to transmit various pieces and forms of data to various components of the system, as well as perform other operations.

The orchestrator component 230 may send the audio data 211 to an ASR component 250. The ASR component 250 transcribes the audio data 211 into text data. The text data output by the ASR component 250 represents one or more than one (e.g., in the form of an n-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The text data output by the ASR component 250 may include a top scoring ASR hypothesis or may include an n-best list of ASR hypotheses. Each ASR hypothesis may be associated with a respective score. Each score may indicate a confidence of ASR processing performed to generate the ASR hypothesis with which the score is associated.

Alternatively or in addition, a second user device B device 110*b* may receive a text-based user input. The device 110*b* may generate text data 213 representing the text-based user input. The device 110*a* may send the text data 213 to the natural-language processing system 120. The orchestrator component 230 may receive the text data 213. The orchestrator component 230 may send text data (e.g., text data output by the ASR component 250 or the received text data 213) to an NLU component 260.

The NLU component 260 (as described in greater detail with reference to FIGS. 6 and 7) attempts to make a semantic interpretation of the phrase(s) or statement(s) represented in the received text data. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the natural-language processing system 120, a skill 290, a skill system(s) 225, etc.) to execute the intent. For example, if the text data corresponds to "play Adele music," the NLU component 260 may determine an intent that the natural-language processing system 120 output music and may identify "Adele" as an artist. For further example, if the text data corresponds to "what is the weather," the NLU component 260 may determine an intent that the natural-language processing system 120 output weather information associated with a geographic location of the device 110. In another example, if the text data corresponds to "turn off the lights," the NLU component 260 may determine an intent that the natural-language processing system 120 turn off lights associated with the device(s) 110 or the user(s) 5. The NLU component 260 may output NLU results data (which may include tagged text data, indicators of intent, etc.).

As described above, the natural-language processing system 120 may perform speech processing using two different components (e.g., the ASR component 250 and the NLU component 260). One skilled in the art will appreciate that the natural-language processing system 120, in at least some implementations, may implement a spoken-language understanding (SLU) component that is configured to process audio data 211 to generate NLU results data. In such an implementation, the SLU component may implement the herein described NLU models.

In some examples, the SLU component may be equivalent to the ASR component 250 and the NLU component 260. For example, the SLU component may process audio data 211 and generate NLU data. The NLU data may include intent data and/or slot data so that directives may be determined based on the intent data and/or the slot data. While the SLU component may be equivalent to a combination of the ASR component 250 and the NLU component 260, the SLU component may process audio data 211 and directly generate the NLU data, without an intermediate step of generating text data (as does the ASR component 250). As such, the SLU component may take audio data 211 representing speech and attempt to make a semantic interpretation of the speech. That is, the SLU component may determine a meaning associated with the speech and then implement that meaning. For example, the SLU component may interpret audio data 211 representing speech from the user 5 in order to derive an intent or a desired action or operation from the user 5. In some examples, the SLU component outputs a most likely NLU response (e.g., hypothesis) recognized in the audio data 211, or multiple hypotheses in the form of a lattice or an N-best list with individual hypotheses corresponding to confidence scores or other scores (such as probability scores, etc.).

The natural-language processing system 120 may include one or more skills 290. A "skill" may be software running on the natural-language processing system 120 that is akin to a software application running on a traditional computing device. That is, a skill 290 may enable the natural-language processing system 120 to execute specific functionality in order to provide data or produce some other requested output. The natural-language processing system 120 may be configured with more than one skill 290. For example, a weather service skill may enable the natural-language processing system 120 to provide weather information, a car service skill may enable the natural-language processing system 120 to book a trip with respect to a taxi or ride sharing service, a restaurant skill may enable the natural-language processing system 120 to order a pizza with respect to the restaurant's online ordering system, etc. A skill 290 may operate in conjunction between the natural-language processing system 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the natural-language processing system 120, a skill 290 may be implemented by a skill system(s) 225. Such may enable a skill system(s) 225 to execute specific functionality in order to provide data or perform some other action requested by a user. Skills may be associated with different domains, such as smart home, music, video, flash briefing, shopping, and custom (e.g., skills not associated with any pre-configured domain). The natural-language processing system 120 may be configured with a single skill 290 dedicated to interacting with more than one skill system(s) 225.

Unless expressly stated otherwise, reference herein to a "skill," or a derivative thereof, may include a skill 290 operated by the natural-language processing system 120 and/or skill operated by a skill system(s) 225. Moreover, the functionality described herein as a skill may be referred to using many different terms, such as an action, bot, app, or the like.

The natural-language processing system 120 may include a TTS component 280. The TTS component 280 may generate audio data (e.g., synthesized speech) from text data using one or more different methods. Text data input to the TTS component 280 may come from a skill 290, the orchestrator component 230, or another component of the natural-language processing system 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The natural-language processing system 120 may include a user-recognition component 295 that recognizes one or more users associated with data input to the natural-language processing system 120. The user-recognition component 295 may take as input the audio data 211 and/or the text data 213. The user-recognition component 295 may perform user recognition by comparing speech characteristics in the audio data 211 to stored speech characteristics of users. The user-recognition component 295 may additionally or alternatively perform user recognition by comparing biometric data (e.g., fingerprint data, iris data, etc.), received by the natural-language processing system 120 in correlation with a user input, to stored biometric data of users. The user-recognition component 295 may additionally or alternatively perform user recognition by comparing image data (e.g., including a representation of at least a feature of a user), received by the natural-language processing system 120 in correlation with a user input, with stored image data including representations of features of different users. The user-recognition component 295 may perform other or additional user recognition processes, including those known in the art. For a particular user input, the user-recognition component 295 may perform processing with respect to stored data of users associated with the device 110 that captured the user input.

The user-recognition component 295 may determine whether a user input originated from a particular user. For example, the user-recognition component 295 may generate a first value representing a likelihood that a user input originated from a first user, a second value representing a likelihood that the user input originated from a second user, etc. The user-recognition component 295 may also determine an overall confidence regarding the accuracy of user recognition operations.

The user-recognition component 295 may output a single user identifier corresponding to the most likely user that originated the user input. Alternatively, the user-recognition component 295 may output multiple user identifiers (e.g., in the form of an N-best list) with respective values representing likelihoods of respective users originating the user input. The output of the user-recognition component 295 may be used to inform NLU processing, processing performed by a skill 290, as well as processing performed by other components of the natural-language processing system 120 and/or other systems.

The natural-language processing system 120 may include profile storage 220. The profile storage 220 may include a variety of information related to individual users, groups of users, devices, etc. that interact with the natural-language processing system 120. A "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information.

The profile storage 220 may include one or more user profiles, with each user profile being associated with a different user identifier. Each user profile may include various user identifying information. Each user profile may also include preferences of the user and/or one or more device identifiers, representing one or more devices registered to the user. Each user profile may include identifiers of skills that the user has enabled. When a user enables a skill, the user is providing the natural-language processing system 120 with permission to allow the skill to execute with respect to the user's inputs. If a user does not enable a skill, the natural-language processing system 120 may not permit the skill to execute with respect to the user's inputs.

The profile storage 220 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 220 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 3 illustrates components for performing annotation of NLU data in accordance with embodiments of the present disclosure. An annotation model 302 of the annotation component 270 may receive, from the developer device 112, data corresponding to a new NLU function and sample invocations of that function. As described above, the function may be one that the natural-language processing system 120 is not currently capable of performing but one that the developer 12 associated with the developer device 112 wishes the system 120 to recognize, process, and output data in accordance with the function. For example, as also described above, the data may correspond to a function that lowers a car window. The data may include the name of the function as well as metadata associated with the function such as an associated domain, intent, and/or other such metadata. The data may further include information regarding the response to the invocation of the function, such as an application programming interface (API) call to make and/or information to output.

Though the developer device 112 is illustrated as a laptop computer, the developer device 112 may be any device, such as a tablet computer, smart phone, server, or other such device. In addition, the data representing the function may be in any form, such as ASCII text data describing the function, a list of associated domains, intents, and/or entities, and/or a list of other functions to be performed together and/or in series.

The data representing the invocation of the function may similarly be in any form. This data, for example, may be audio data that represents speech requesting the function and/or text data that represents words requesting the function. The data representing the invocation may further be or include domains, intents, and/or entities associated with that particular invocation.

The annotation model 302 may be a neural network, a classifier, a support-vector machine, or any other such component. The annotation model 302 may be trained using training data that, for example, includes a plurality of invocations of functions and their associated NLU data. This training data may be generated by a human and/or reviewed by a human for correctness. Once trained using the training data, the annotation model 302 may then process additional data (such as data received from the developer device 112) and determine associated NLU data based on its similarity to items in the training data.

The annotation model 302 may process the data representing the function and/or invocations and output one or more candidate domains, intents, and/or entities associated with the invocation. The annotation model 302 may output a single domain, intent, and/or entity for each associated item in the data or a ranked N-best list of most likely value for each item. The annotation model 302 may also output one or more values representing a confidence that the determined NLU data accurately reflects the sample invocation received from the developer device 112. The confidence value may be a single value representing overall confidence in the NLU data and/or a number of confidence values for one or more of the candidate domain(s), intent(s), and/or entity(ies). In some embodiments, the annotation model 302 outputs only the candidate values, and a separate component processes the data received from the developer device 112 and the output of the annotation model 302 to determine the one or more confidence value(s).

A re-training effect(s) determination component 304 may process the output of the annotation model 302 to determine what effect(s), if any, the new annotations output by the annotation model 302 may have on one or more different NLU components, if any. This effect may be referred to as the "impact" that the result of re-training the NLU component may have on the NLU component itself and/or effects seen by the end user 110. In some embodiments, the effect may be measured by determining a difference value by estimating a difference between a current configuration of the one or more NLU components before re-training and after re-training. For example, if a large number of nodes in a neural network of the NLU component have different values after-retraining and/or if the values of nodes change by a large amount, the re-training effect(s) determination component 304 may determine that the effect(s) of re-training are high and determine a corresponding high difference value. For example, if at least 10% of the nodes of the neural network have different values after retraining and/or if a value of any node changes by more than 10%, the re-training effect(s) determination component 304 may determine that the effect(s) of re-training are high. In other embodiments, the effect(s) of re-training may be measured by determining a number of users 110 potentially affected by the re-training. The difference value may further be based at least in part on number of affected users and may be determined by, for example, determining a number of user devices 110 associated with the developer device 112 and/or by determining a frequency that functions similar to the function received by the developer device 112 are invoked by a user 10.

In some embodiments, the degree of effect determined by the re-training effect(s) determination component 304 may be based at least in part on a number of other functions that may be affected by (e.g., re-trained based on) the new annotation data determined by the annotation model 302. The new annotation data may, for example, include a new domain, intent, and/or entity that is associated with a number of other NLU functions. NLU component(s) associated with these other functions may then also be re-trained to reflect the new annotations. For example, prior to receiving the data from the developer device 112, the NLU component(s) may have treated two similar but distinct domains, intents, and/or entities as the same, and processed them with associated functions accordingly. The new data received by the developer device 112 and as processed by the annotation model 302 may, for example, cause these two similar but distinct items to be classified as two different domains, intents, and/or entities and thus processed differently. Other, existing NLU functions that previously treated these items as the same may thus be updated to treat them differently. The re-training effect(s) determination component 304 may determine a number of other functions affected by the new data and determine an overall effect based in part thereon.

An annotator device manager 306 may process the confidence value output by the annotation model 302 and/or the effect value (e.g., degree of change of the NLU component(s)) and determine to send, to the annotator device 114, data corresponding to the determined NLU data. The annotator device manager 306 may cause this data to appear on a screen of the annotator device 114 for review by a human annotator 14. The human annotator 14 may then view this data and input response data, which may include a confirmation of correctness for some or all of the NLU data and/or further input correcting errors in the NLU data. The annotator device 114 may then send this updated annotation data back to the annotator device manager 306. The annotator device manager 306 may send additional data back to the annotator device 114 that requests additional information related to the NLU data and/or additional confirmation corresponding to the received data.

Though the annotator device 114 is depicted as a single device, it may be any number of devices, and there may be any number of annotators 14. For example, the NLU data may be sent to a plurality of annotator devices 114, and the responses therefrom may be aggregated and filtered. Updated annotation data that is consistent across a number of annotator devices 114 may be retained for further processing, while updated annotation data that is received from only one or a few annotator devices 114 may be discarded.

In some embodiments, the annotator device manager 306 triggers review of the NLU data by the annotator device 114 when either one of the confidence value satisfies a first condition (e.g., is lower than a confidence threshold) or when the effect value satisfies a second condition (e.g., is higher than an effect threshold). In other embodiments, the annotator device manager 306 considers both values simultaneously and triggers review when, for example, both the confidence value satisfies the first condition and the effect value satisfies the second condition. In some embodiments, if either value is very low or very high (e.g., very low confidence or very high effect), the annotator device manager 306 triggers review regardless of the other value.

In some embodiments, a re-training data determination component 308 determines additional training data to be used with the sample invocation(s) and functions received from the developer device 112 to be used when re-training the NLU component(s). The number of sample invocations may, for example, be relatively small (e.g., 1-100 sample invocations), and the re-training of the NLU component(s) may not least to robust operation of the natural-language processing system 120 such that the user 10 may wish to invoke the new function using an invocation not adequately represented in the sample invocations. This lack of robustness may lead to a diminished user experience and frustration on the part of the user 10.

The re-training data determination component 308 may, in some embodiments, select a subset of available training data present in a training data store 320. The training data store 320 may include a subset of data in the profile storage 220 (e.g., prior utterances of the user 10 and/or of other users) and/or other sources of training data, such as publicly available training data sets, social media posts, and/or dialog transcripts. If training data dissimilar to that of the received new functions and/or sample invocations is selected, re-training the NLU component with this dissimilar data may lead to, for example, over inclusiveness in calling the new function; the natural-language processing system 120 may thus use the new function to process an invocation intended for a different function. The re-training data determination component 308 may thus select the subset of training data based on how similar the items in the subset are to one or more of the received sample invocations.

In some embodiments, the re-training data determination component 308 determines a domain, intent, and/or entity from data received by the annotation model 302 and determines a subset of the training data 320 that has a greatest number of similar domains, intents, and/or entities. The re-training data determination component 308 may apply different weights to the different types of NLU data; a matching entity may, for example, carry more weight than a matching domain. The re-training data determination component 308 may thus compute a similarity score, which may be a weighted score, for each subset of training data 320 and select the subset having the greatest score.

The re-training data determination component 308 may further consider the type of the subset of training data 320 in making its selection of training data. A first subset of training data may be of higher quality than a second subset, for example, meaning that (for example) the first subset may include fewer errors and/or represent a broader range of candidate invocations. The first, higher-quality subset may be, for example, a human-curated and reviewed set of training data, while the second subset may be unreviewed, such as communication data from a social-media source. The re-training data determination component 308 may select such a first, higher-quality subset over a second, lower-quality subset even if the first subset has a lower similarity score than the second. The re-training data determination component 308 may determine the quality of the subset by processing metadata received from the training data store 320 and/or by determining a number of invocations present in the subset.

The re-training data determination component 308 may further select items in the subset of training data 320 by taking into account associated user permissions corresponding to those items. The training data 320 may include data corresponding to utterances of a user 10; the user 10 may grant or deny permission to use the data by, for example, indicating so in profile storage 220. If a closest-matching item of training data is not associated with such a grant of permission, the re-training data determination component 308 may select a next-closest matching item.

In other embodiments, the re-training data determination component 308 determines the similarity score by comparing encoded values of the sample invocations to encoded values of invocations present in the training data 320. The re-training data determination component 308 may, for example, include a neural-network encoder, also known as a sentence encoder, that maps a given invocation into a unique set of values, such as an N-dimensional vector of floating-point numbers. Every possible invocation (and/or other sentence) may thus be mapped to a different N-dimensional vector. The encoder may be trained such that similar invocations are mapped to similar vectors (e.g., vectors having values close to each other) while dissimilar invocations (e.g., invocations involving unrelated functions) are mapped to dissimilar vectors (e.g., vectors having values different from each other).

In various embodiments, this mapping may be referred to as a mapping to an "embedding space," which may be an N-dimensional space in which each invocation is represented as a point in the space. Similar invocations are near each other in the embedding space, while dissimilar invocations are far from each other. The amount of separation between two points represents the degree of similarity/dissimilarity between the corresponding invocations.

Thus, in some embodiments, the re-training data determination component 308 may select a subset of the training data 320 based on how far apart items in the subset are from the sample invocations in the embedding space and select subset(s) having the closest corresponding items. For example, the re-training data determination component 308 may, for each subset, select a number of points in the embedding space (e.g., 100-1000) closest to the corresponding points of the sample invocations and compute a total distance value between each of the points of the sample invocation and the number of closest points. E.g., for a first point corresponding to a first sample invocation, the total distance to each of the closest 100 points is determined, for a second point corresponding to a second sample invocation, the total distance to each of the closest 100 points is determined, and so on. The subset of the training data 320 having the lowest total distance may then be selected.

An NLU component re-training manager 310 may collect the training data determined by the annotation model 302, the annotator device manager 306, and/or the re-training determination component 308. The NLU component re-training manager 310 may transform the data as necessary for consistency or as required by the NLU component 260. The NLU component re-training manager 310 may then send the determined NLU training data to the NLU component 260 for re-training of one or more components thereof. For example, with reference to FIG. 6, a shortlister 650 and/or recognizer 663 may be re-trained. The re-training may include use of the NLU training data and, in some embodiments, other training data used to train the NLU component(s) to recognize other functions. The training may include, for example, a gradient descent algorithm to find new values for nodes in the NLU component and a back-propagation algorithm to update the nodes with the new values.

FIGS. 4A and 4B illustrate a process flow for determining re-training data in accordance with embodiments of the present disclosure. As described above with reference to FIG. 3, a developer device 112 receives (402) data (from, e.g., a developer 12) representing a new NLU function and at least one sample invocation of the function, and it sends (404) this data to the annotation model 302 of the annotation component 270. The annotation model 302 annotates (406) the invocation, as described above, and determines NLU data, such as a new NLU function, domain data, intent data, and/or entity data, which it in turn sends (410) to the re-training data determination component 308.

The re-training data determination component 308 may then determine (412) additional re-training data, as described above (by, for example, comparing the sample invocations to training data in an embedding space. The re-training data determination component 308 may then send (414) the NLU function, sample invocation, annotation data, and/or additional data to the NLU component re-training manager 310.

The NLU component re-training manager 310 may then determine (416) NLU training data by, e.g., re-formatting the received data as necessary and sends corresponding NLU training data 418 to the NLU component. The NLU component is re-trained (420) using the NLU training data 418 and may send result data 422 (e.g., data representing success or failure) back to the NLU component re-training manager 310.

Figure 5B:
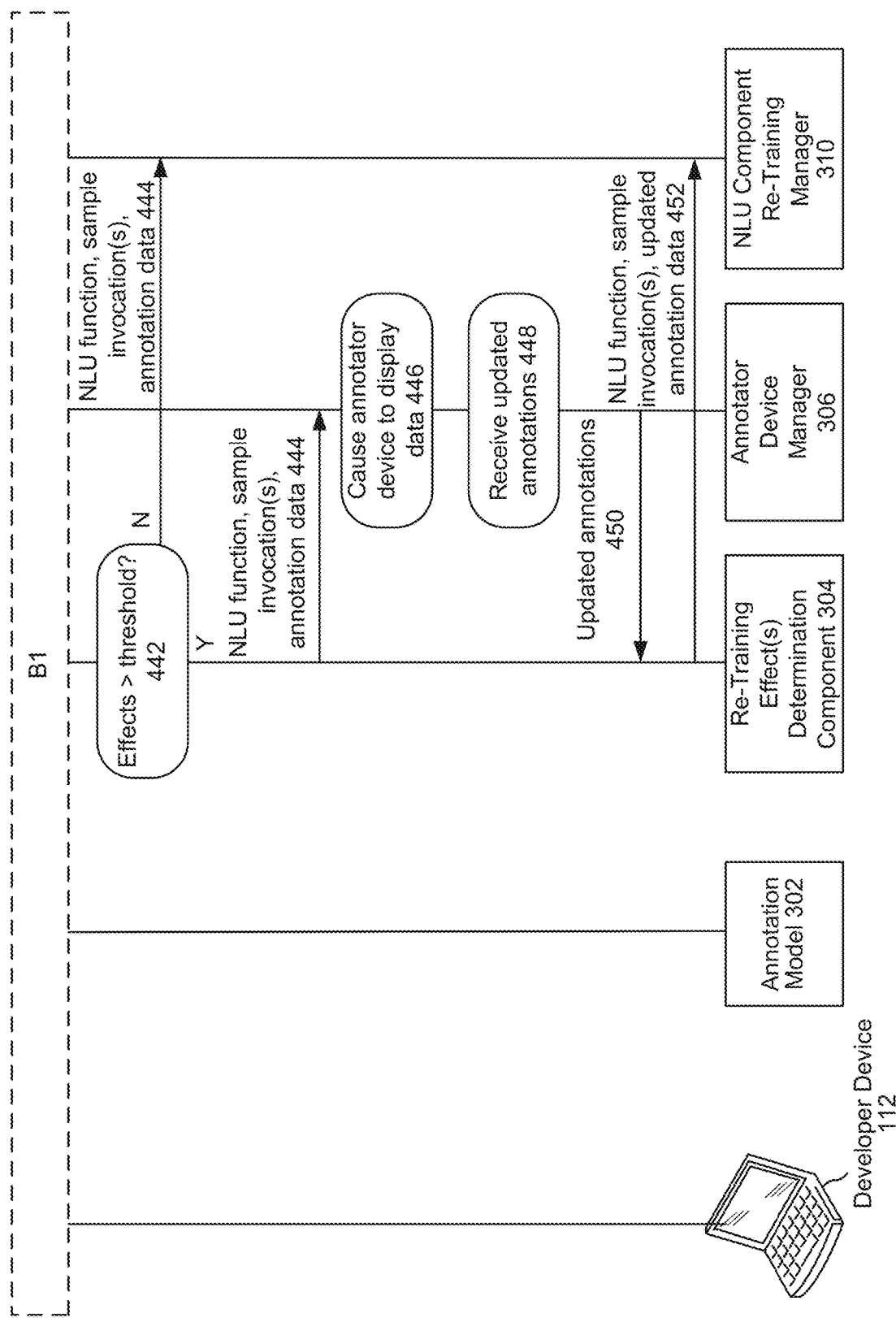

FIGS. 5A and 5B illustrate a process flow for determining an effect of re-training in accordance with embodiments of the present disclosure. As described above, a developer device 112 may receive (432) a new NLU function and sample invocations of that function, which it may send (434) to the annotation model 302. As also described above, the annotation model may determine (436) annotations corresponding to the invocations and send corresponding data 438 to the re-training effect determination component 304.

As described above, the re-training effect determination component 304 may determine (440) a value representing a degree of effect the re-training may have on the NLU component and/or user 10. If this value does not satisfy a condition (e.g., it is less than a threshold and thus has a low effect), the re-training effect determination component 304 may send the determined data 444 to the NLU component re-training manager 310, which may cause re-training of the NLU component as described above. If, however, the value satisfies the condition (e.g., it is greater than a threshold and thus has a high effect), the re-training effect determination component 304 sends corresponding data 444 to the annotator device manager 306. The annotator device manager 306 may then cause (446) display of the data on the annotator device 114, which may receive (448) updated annotations, which the device 114 sends (450) back to the re-training effect determination component 304. The re-training effect determination component 304 may then send the updated annotation data 452, along with other data, to the NLU component re-training manager 310.

Figure 6:
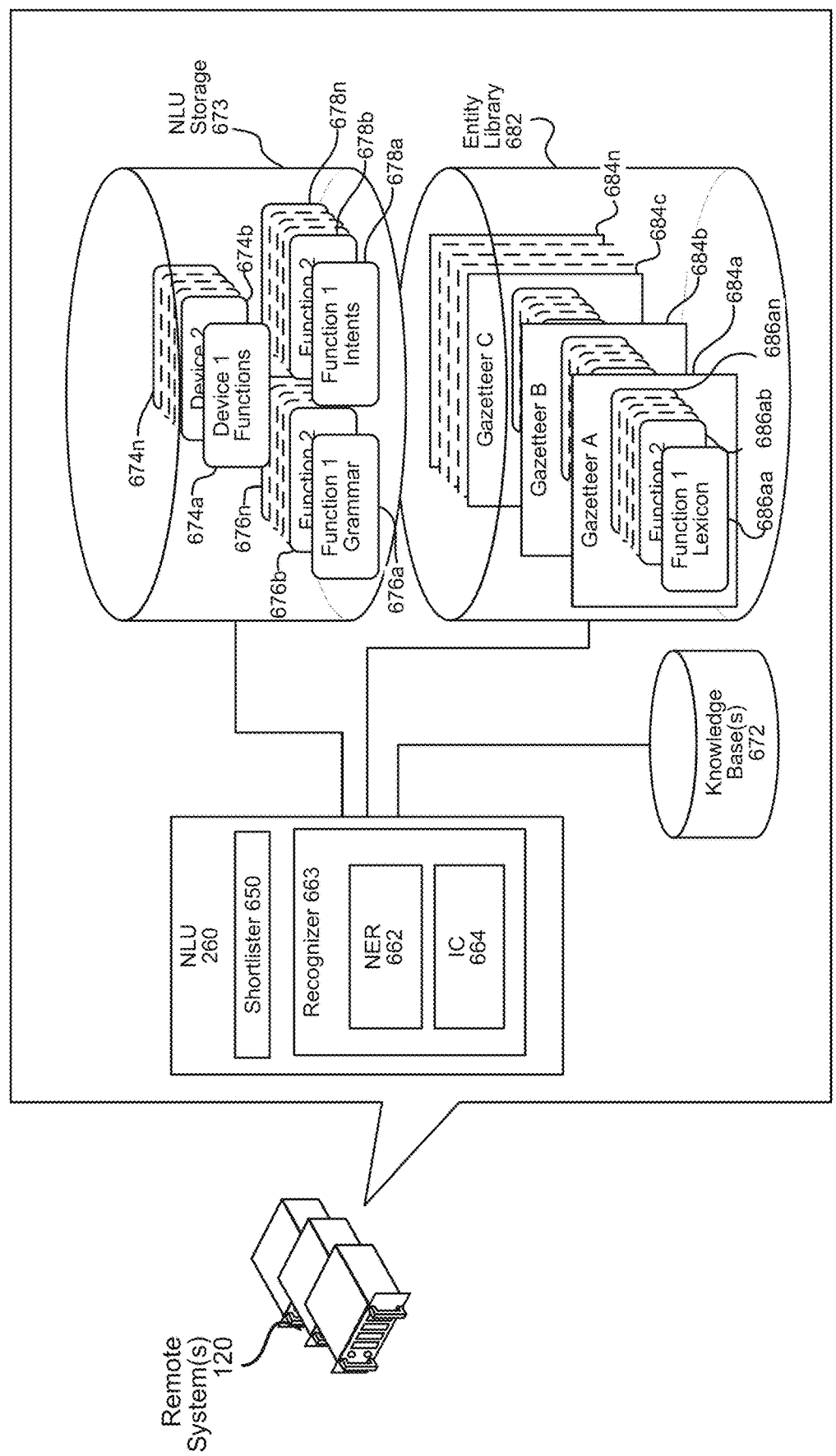
FIG. 6 illustrates components for natural-language understanding in accordance with embodiments of the present disclosure.
Figure 7:
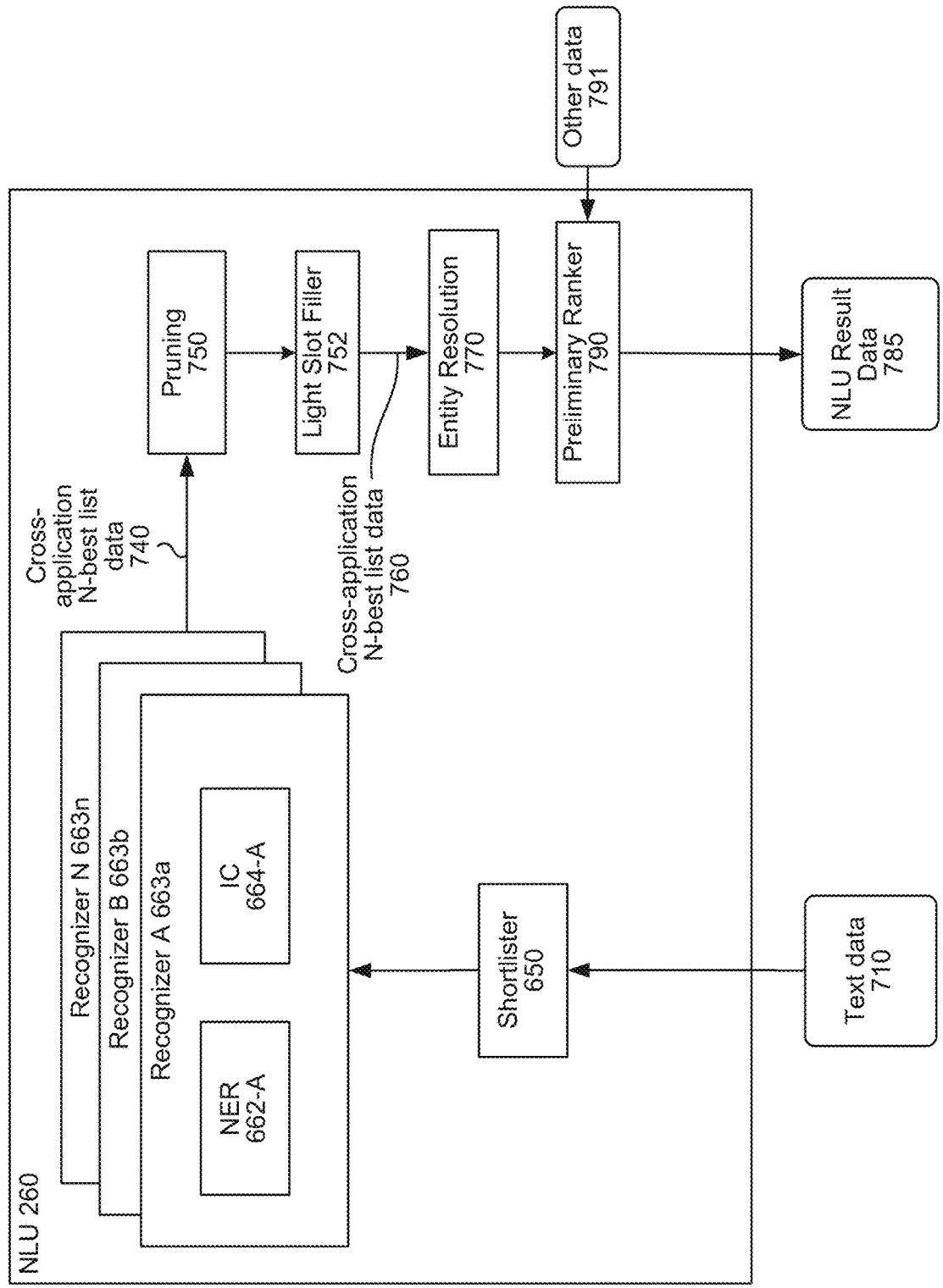
FIG. 7 illustrates further components for natural-language understanding in accordance with embodiments of the present disclosure.

FIG. 6 illustrates how NLU processing may be performed on input text data derived from input audio data. The NLU component 260 (such as the one depicted in FIG. 2) determines a semantic interpretation of text represented in text data. That is, the NLU component 260 determines the meaning behind the text represented in text data based on the individual words. The NLU component 260 interprets the text to derive an intent or a desired action of the user as well as the pertinent pieces of information in the text (e.g., entities) that allow a device (e.g., the user device 110, system 120, skill(s) 290, and/or skill system(s) 225) to complete that action.

The NLU component 260 may process text data to determine several hypotheses of a domain, intent, and/or entity corresponding to a single utterance. For example, if the ASR component 250 outputs ASR results including an N-best list of hypotheses, the NLU component 260 may process the text data with respect to all (or a portion of) the textual interpretations represented therein. The NLU component 260 may annotate text represented in text data by parsing and/or tagging the text. For example, for the text "tell me the weather for Seattle," the NLU component 260 may tag "tell me the weather for Seattle" as a command (e.g., to output weather information) as well as tag "Seattle" as a location for the weather information.

The NLU component 260 may include a shortlister component 650. The shortlister component 650 selects applications that may execute with respect to text data 710 input to the NLU component (e.g., applications that may execute the command). The shortlister component 650 thus limits downstream, more resource intensive NLU processes to being performed with respect to applications that may execute the command.

Without a shortlister component 650, the NLU component 260 may process a given hypothesis with respect to every application of the system, either in parallel, in series, or using some combination thereof. By including a shortlister component 650, the NLU component 260 may process a given hypothesis with respect to only the applications that may execute the command. This reduces total compute power and latency attributed to NLU processing.

The NLU component 260 may include one or more recognizers 663a—n. Each recognizer 663 may be associated with a different function, content source, and/or speech-processing system. The NLU component 260 may determine a function potentially associated with the command represented in text data input thereto in order to determine the proper recognizer 663 to process the hypothesis. The NLU component 260 may determine a command represented in text data is potentially associated with more than one function. Multiple recognizers 663 may be functionally linked (e.g., a telephony/communications recognizer and a calendaring recognizer may utilize data from the same contact list).

If the shortlister component 650 determines text corresponding to a hypothesis is potentially associated with multiple skills 290 and/or multiple speech-processing systems, the recognizers 663 associated with the skills 290 and/or multiple speech-processing systems (e.g., the recognizers 663 associated with the applications in the subset selected by the shortlister 650) may process the text. The selected recognizers 663 may process the text in parallel, in series, partially in parallel, etc. For example, if text corresponding to a hypothesis potentially implicates both a communications speech-processing system and a music speech-processing system, a recognizer associated with the communications speech-processing system may process the text in parallel, or partially in parallel, with a recognizer associated with the music application processing the text. The output generated by each recognizer 663 may be scored, with the overall highest scored output from all recognizers 663 ordinarily being selected to be the correct result.

The NLU component 260 may communicate with various storages to determine the potential speech-processing system(s) associated with a command represented in text data. The NLU component 260 may communicate with an NLU storage 673, which includes databases of devices (674a-674n) identifying functions associated with specific devices. For example, the user device 110 may be associated with speech-processing systems for music, calendaring, contact lists, device-specific communications, etc. In addition, the NLU component 260 may communicate with an entity library 682, which includes database entries about specific services on a specific device, either indexed by device ID, user ID, or group user ID, or some other indicator.

Each recognizer 663 may include a named entity recognition (NER) component 662. The NER component 662 attempts to identify grammars and lexical information that may be used to construe meaning with respect to a command represented in text data input therein. The NER component 662 identifies portions of text represented in text data input into the NLU component 260 that correspond to a named entity that may be recognizable by the system. The NER component 662 (or other component of the NLU component 260) may also determine whether a word refers to an entity that is not explicitly mentioned in the utterance text, for example words such as "him," "her," or "it."

Each recognizer 663, and more specifically each NER component 662, may be associated with a particular grammar model 676, a particular set of intents 678, and a particular personalized lexicon 686. Each gazetteer 684 may include function-indexed lexical information associated with a particular user and/or device. For example, gazetteer A (684a) includes function-indexed lexicons 686aa to 686an. A user's music function lexical information might include album titles, artist names, and song names, for example, whereas a user's contact-list lexical information might include the names of contacts. Since every user's music collection and contact list is presumably different, this personalized information improves entity resolution.

An NER component 662 may apply grammar models 676 and/or lexicons 686 associated with the function (associated with the recognizer 663 implementing the NER component 662) to determine a mention one or more entities in text data input thereto. In this manner, the NER component 662 may identify "slots" (i.e., particular words in text data) that may be needed for later command processing. The NER component 662 may also label each slot with a type of varying levels of specificity (e.g., noun, place, city, artist name, song name, etc.).

Each grammar model 676 may include the names of entities (i.e., nouns) commonly found in text about the particular function to which the grammar model 676 relates, whereas the lexicon 686 is personalized to the user(s) and/or the user device 110 from which the input data or input text data originated. For example, a grammar model 676 associated with a shopping function may include a database of words commonly used when people discuss shopping.

A process called named entity resolution may link a portion of text to an entity known to the system. To perform this named entity resolution, the NLU component 260 may use gazetteer information (684a-684n) stored in an entity library storage 682. The gazetteer information 684 may be used to match text represented in text data with different entities, such as song titles, contact names, etc. Gazetteers may be linked to users (e.g., a particular gazetteer may be associated with a specific user's music collection), may be linked to certain function categories (e.g., shopping, music, video, communications, etc.), or may be organized in a variety of other ways.

Each recognizer 663 may also include an intent classification (IC) component 664. The IC component 664 parses text data to determine an intent(s) of the function associated with the recognizer 663 that potentially corresponds to the text data. An intent corresponds to an action to be performed that is responsive to the command represented by the text data. The IC component 664 may communicate with a database 678 of words linked to intents. For example, a music intent database may link words and phrases such as "quiet," "volume off," and "mute" to a "mute" intent. The IC component 664 identifies potential intents by comparing words in the text data to the words and phrases in an intents database 678 associated with the function that is associated with the recognizer 663 implementing the IC component 664.

The intents identifiable by a specific IC component 664 may be linked to function-specific (i.e., the function associated with the recognizer 663 implementing the IC component 664) grammar model 676 with "slots" to be filled. Each slot of a grammar model 676 may correspond to a portion of the text data that the system believes corresponds to an entity. For example, a grammar model 676 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar models 676 may not be structured as sentences, but rather based on associating slots with grammatical tags.

For example, an NER component 662 may parse text data to identify words as subject, object, verb, preposition, etc. based on grammar rules and/or models prior to recognizing named entities in the text data. An IC component 664 (implemented by the same recognizer 663 as the NER component 662) may use the identified verb to identify an intent. The NER component 662 may then determine a grammar model 676 associated with the identified intent. For example, a grammar model 676 for an intent corresponding to <PlayMusic> may specify a list of slots applicable to play the identified object and any object modifier (e.g., a prepositional phrase), such as {Artist Name}, {Album Name}, {Song name}, etc. The NER component 662 may then search corresponding fields in a lexicon 686 associated with the function associated with the recognizer 663 implementing the NER component 662 and may match words and phrases in the text data the NER component 662 previously tagged as a grammatical object or object modifier with those identified in the lexicon 686.

The NER component 662 may perform semantic tagging, which refers to the labeling of a word or combination of words according to their type/semantic meaning. The NER component 662 may parse text data using heuristic grammar rules, or a model may be constructed using techniques such as hidden Markov models, maximum entropy models, log linear models, conditional random fields (CRF), and the like. For example, an NER component 662 implemented by a music function recognizer 663 may parse and tag text corresponding to "play mother's little helper by the rolling stones" as {Verb}: "Play," {Object}: "mother's little helper," {Object Preposition}: "by," and {Object Modifier}: "the rolling stones." The NER component 662 may identify "Play" as a verb based on a word database associated with the music function, which an IC component 664 (which may also implemented by the music function recognizer 663) may determine that the word corresponds to a <PlayMusic> intent. At this stage, no determination may have been made as to the meaning of "mother's little helper" and "the rolling stones," but based on grammar rules and models, the NER component 662 may have determined that the text of these phrases relates to the grammatical object (i.e., entity) of the text data.

The frameworks linked to the intent may then be used to determine what database fields may be searched to determine the meaning of these phrases, such as searching a user's gazetteer 684 for similarity with the framework slots. For example, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 684 does not resolve a slot/field using gazetteer information, the NER component 662 may search, in the knowledge base 572, the database of generic words associated with the function. For example, if the text data includes text corresponding to "play songs by the rolling stones," after failing to determine an album name or song name called "songs" by "the rolling stones," the NER component 662 may search the function's vocabulary for the word "songs." In the some embodiments, generic words may be checked before the gazetteer information, or both may be tried, potentially producing two different results.

The NLU component 260 may tag text to attribute meaning to the text. For example, the NLU component 260 may tag "play mother's little helper by the rolling stones" as {intent}: <PlayMusic>, {artist name}: rolling stones, {media type}: SONG, and {song title}: mother's little helper. In another example, the NLU component 260 may tag "play songs by the rolling stones" as {intent}: <PlayMusic>, {artist name}: rolling stones, and {media type}: SONG.

The shortlister component 650 may receive text data 710 output from the ASR component 250 (as illustrated in FIG. 2). The ASR component 250 may embed the text data 710 into a form processable by a trained model(s) using sentence-embedding techniques. Sentence embedding may include, in the text data 710, text in a structure that enables the trained models of the shortlister component 650 to operate on the text. For example, an embedding of the text data 710 may be a vector representation of the text data.

The shortlister component 650 may make binary determinations (e.g., yes/no determinations) regarding which skill(s) 290 relate to the text data 710. The shortlister component 650 may make such determinations using the one or more trained models described herein above. If the shortlister component 650 implements a single trained model for each skill 290, the shortlister component 650 may simply run the models that are associated with enabled applications as indicated in a profile (e.g., profile 502) associated with the user device 110 and/or user that originated the command.

The shortlister component 650 may generate N-best list data representing applications that may execute with respect to the command represented in the text data 710. The size of the N-best list represented in the N-best list data is configurable. In an example, the N-best list data may indicate every application of the system as well as contain an indication, for each application, regarding whether the application is likely capable to execute the command represented in the text data 710. In another example, instead of indicating every application of the system, the N-best list data may only indicate all of the applications that are likely to be able to execute the command represented in the text data 710. In yet another example, the shortlister component 650 may implement thresholding such that the N-best list data may indicate no more than a maximum number of applications that may execute the command represented in the text data 710. In an example, the threshold number of applications that may be represented in the N-best list data is ten (10). In another example, the applications included in the N-best list data may be limited by a threshold a score, where only applications indicating a likelihood to handle the command is above a certain score (as determined by processing the text data 710 by the shortlister component 650 relative to such applications).

The pruning component 750 creates a new, shorter N-best list (i.e., represented in new N-best list data 760 discussed below) based on the previous N-best list data 740. The pruning component 750 may sort the tagged text represented in the N-best list data 740 according to their respective scores.

The pruning component 750 may perform score thresholding with respect to the N-best list data 740. For example, the pruning component 750 may select entries represented in the N-best list data 740 associated with a score satisfying (e.g., meeting and/or exceeding) a score threshold. The pruning component 750 may also or alternatively perform number of entry thresholding. For example, the pruning component 750 may select the top scoring entry(ies) associated with each different category of function (e.g., music, shopping, communications, etc.) represented in the N-best list data 740, with the new N-best list data 760 including a total number of entries meeting or falling below a threshold number of entries. The purpose of the pruning component 750 is to create a new list of top scoring entries so that downstream, more resource intensive processes may only operate on the tagged text entries that most likely correspond to the command input to the system.

The NLU component 260 may also include a light slot filler component 752. The light slot filler component 752 can take text from slots represented in the tagged text entry or entries output by the pruning component 750 and alter it to make the text more easily processed by downstream components. The light slot filler component 752 may perform low latency operations that do not involve heavy operations such as reference to a knowledge base. The purpose of the light slot filler component 752 is to replace words with other words or values that may be more easily understood by downstream components. For example, if a tagged text entry includes the word "tomorrow," the light slot filler component 752 may replace the word "tomorrow" with an actual date for purposes of downstream processing. Similarly, the light slot filler component 752 may replace the word "CD" with "album" or the words "compact disc." The replaced words are then included in the N-best list data 760.

The NLU component 260 sends the N-best list data 760 to an entity resolution component 770. The entity resolution component 770 can apply rules or other instructions to standardize labels or tokens from previous stages into an intent/slot representation. The precise transformation may depend on the function (e.g., for a travel function, the entity resolution component 770 may transform a text mention of "Boston airport" to the standard BOS three-letter code referring to the airport). The entity resolution component 770 can refer to an authority source (e.g., a knowledge base) that is used to specifically identify the precise entity referred to in each slot of each tagged text entry represented in the N-best list data 760. Specific intent/slot combinations may also be tied to a particular source, which may then be used to resolve the text. In the example "play songs by the stones," the entity resolution component 770 may reference a personal music catalog, Amazon Music account, user profile (described herein), or the like. The entity resolution component 770 may output data including an altered N-best list that is based on the N-best list represented in the N-best list data 760, but also includes more detailed information (e.g., entity IDs) about the specific entities mentioned in the slots and/or more detailed slot data that can eventually be used by a function. The NLU component 260 may include multiple entity resolution components 770 and each entity resolution component 770 may be specific to one or more functions.

The entity resolution component 770 may not be successful in resolving every entity and filling every slot represented in the N-best list data 760. This may result in the entity resolution component 770 outputting incomplete results. The NLU component 260 may include a final ranker component 790, which may consider such errors when determining how to rank the tagged text entries for potential execution. For example, if a book function recognizer 663 outputs a tagged text entry including a <ReadBook> intent flag, but the entity resolution component 770 cannot find a book with a title matching the text of the item, the final ranker component 790 may re-score that particular tagged text entry to be given a lower score. The final ranker component 790 may also assign a particular confidence to each tagged text entry input therein. The confidence score of a particular tagged text entry may be affected by whether the tagged text entry has unfilled slots. For example, if a tagged text entry associated with a first function includes slots that are all filled/resolved, that tagged text entry may be associated with a higher confidence than another tagged text entry including at least some slots that are unfilled/unresolved.

The final ranker component 790 may apply re-scoring, biasing, or other techniques to obtain the most preferred tagged and resolved text entry. To do so, the final ranker component 790 may consider not only the data output by the entity resolution component 770, but may also consider other data 791. The other data 791 may include a variety of information. For example, the other data 791 may include function rating or popularity data. For example, if one function has a particularly high rating, the final ranker component 790 may increase the score of a tagged text entry or entries associated with or otherwise invoking that particular function. The other data 791 may also include information about functions that have been specifically enabled by the user. For example, the final ranker component 790 may assign higher scores to tagged text entries associated with or otherwise invoking enabled functions than tagged text entries associated with or otherwise invoking non-enabled functions. User history may also be considered, such as if the user regularly uses a particular function or does so at particular times of day. Date, time, location, weather, type of user device 110, user ID, context, and other information may also be considered. For example, the final ranker component 790 may consider when any particular functions are currently active (e.g., music being played, a game being played, etc.). Following final ranking, the NLU component 260 may output NLU output data 785 to the orchestrator component 230. The NLU output data 785 may include various entries, with each entry representing an NLU processing confidence score, an intent, slot data, and a potential skill or skill that may operating with respect to the respective entry's data.

Following preliminary ranking, the NLU component 260 may output NLU results data 785. The NLU component 260 may send the NLU results data 785 to the orchestrator component 230. The NLU results data 785 may include first NLU results data 785a including tagged text associated with a first speech-processing system, second NLU results data 785b including tagged text associated with a second speech-processing system, etc. The NLU results data 785 may include tagged text data corresponding to the top scoring tagged text entries as determined by the preliminary ranker component 790.

The data 785 output from the NLU component 260 may include an N-best list of NLU results, where each item in the N-best list may correspond to a particular recognizer 663 and corresponding skill 290. Thus, for example, first NLU results of the N-best list may be associated with a first skill 290a, second NLU results of the N-best list may be associated with a second skill 290b, third NLU results of the N-best list may be associated with a third skill 290c, etc. Moreover, the first NLU results may correspond to text tagged to attribute meaning that enables the first skill 290a to execute with respect to the first NLU results, the second NLU results may correspond to text tagged to attribute meaning that enables the second skill 290b to execute with respect to the second NLU results, the third NLU results may correspond to text tagged to attribute meaning that enables the third skill 290c to execute with respect to the third NLU results, etc. The data 785 may also include scores corresponding to each item in the N-best list. Alternatively, the NLU result data 785 output to a particular skill 290 may include NER and IC data output by the particular skill's recognizer 663 while the NLU result data 785 output to the orchestrator component 230 may include only a portion of the NLU result data 785, for example the scores corresponding to certain skills.

The system may be configured with thousands, tens of thousands, etc. skills 290. The orchestrator component 230 enables the system to better determine the best skill 290 to execute the command input to the system. For example, first NLU results may correspond or substantially correspond to second NLU results, even though the first NLU results are operated on by a first skill 290a and the second NLU results are operated on by a second skill 290b. The first NLU results may be associated with a first confidence score indicating the system's confidence with respect to NLU processing performed to generate the first NLU results. Moreover, the second NLU results may be associated with a second confidence score indicating the system's confidence with respect to NLU processing performed to generate the second NLU results. The first confidence score may be similar or identical to the second confidence score since the first NLU results correspond or substantially correspond to the second NLU results. The first confidence score and/or the second confidence score may be a numeric value (e.g., from 0.0 to 1.0). Alternatively, the first confidence score and/or the second confidence score may be a binned value (e.g., low, medium, high).

The orchestrator component 230 may solicit the first skill 290a and the second skill 290b to provide potential result data based on the first NLU results and the second NLU results, respectively. For example, the orchestrator component 230 may send the first NLU results to the first skill 290a along with a request for the first skill 290a to at least partially execute a command with respect to the first NLU results. The orchestrator component 230 may also send the second NLU results to the second skill 290b along with a request for the second skill 290b to at least partially execute a command with respect to the first NLU results. The orchestrator component 230 receives, from the first skill 290a, first result data generated from the first skill's execution with respect to the first NLU results. The orchestrator component 230 also receives, from the second skill 290b, second results data generated from the second skill's execution with respect to the second NLU results.

The result data 630 may include various components. For example, the result data 630 may include content (e.g., audio data, text data, and/or video data) to be output to a user. The result data 630 may also include a unique identifier (ID) used by the remote system 120 and/or the skill server(s) 225 to locate the data to be output to a user. The result data 630 may also include an instruction. For example, if the command corresponds to "turn on the light," the result data 630 may include an instruction causing the system to turn on a light associated with a profile of the user device 110 and/or user.

A system that does not use the orchestrator component 230 as described above may instead select the highest scored preliminary ranked NLU results data 785 associated with a single skill. The system may send the NLU results data 785 to the skill 290 along with a request for output data. In some situations, the skill 290 may not be able to provide the system with output data. This results in the system indicating to the user that the command could not be processed even though another skill associated with lower ranked NLU results data 785 could have provided output data responsive to the command.

Figure 8:
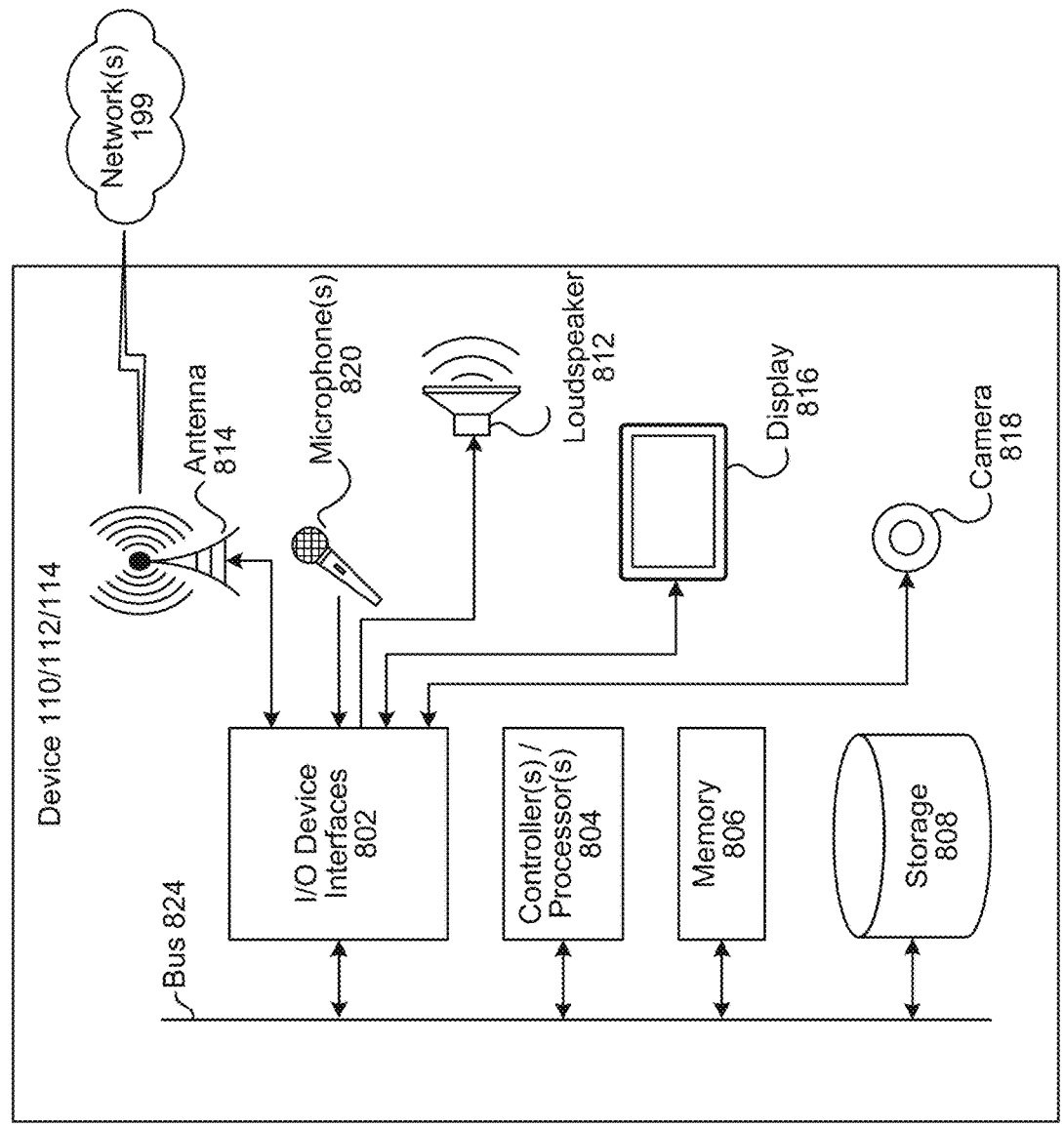
FIG. 8 illustrates components of a device in accordance with embodiments of the present disclosure.
Figure 9:
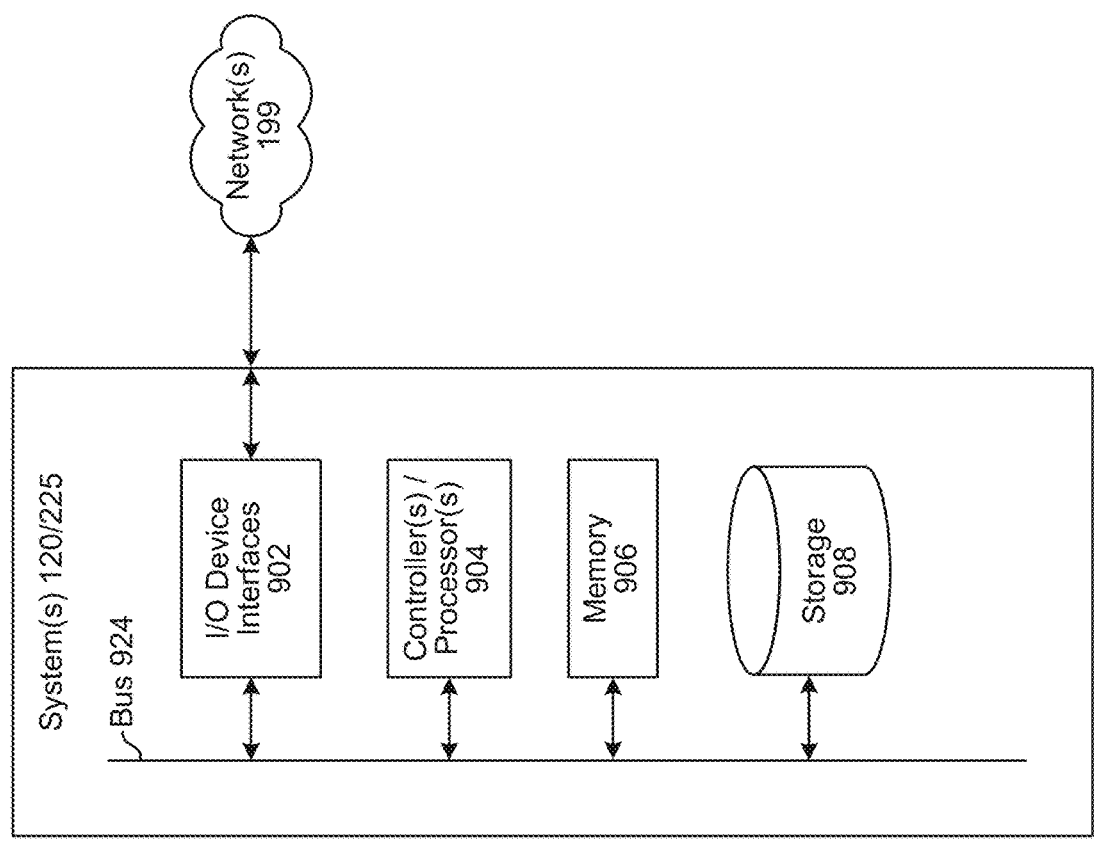
FIG. 9 illustrates components of a system in accordance with embodiments of the present disclosure.

FIG. 8 is a block diagram conceptually illustrating a device 110/112/114 that may be used with the system. FIG. 9 is a block diagram conceptually illustrating example components of a remote device, such as the system(s) 120, which may assist with ASR processing, NLU processing, etc., and the skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill system(s) 225, etc. In operation, each of these systems may include computer-readable and computer-executable instructions that reside on the respective device (120/225), as will be discussed further below.

Each of these devices (110/112/114/120/225) may include one or more controllers/processors (804/904), which may each include a central processing unit (CPU) for processing data and computer-readable instructions, and a memory (706/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/112/114/120/225) may also include a data storage component (808/908) for storing data and controller/processor-executable instructions. Each data storage component (808/908) may individually include one or more non-volatile storage types such as magnetic storage, optical storage, solid-state storage, etc. Each device (110/112/114/120/225) may also be connected to removable or external non-volatile memory and/or storage (such as a removable memory card, memory key drive, networked storage, etc.) through respective input/output device interfaces (702/902).

Computer instructions for operating each device (110/112/114/120/225) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/112/114/120/225) includes input/output device interfaces (802/902). A variety of components may be connected through the input/output device interfaces (802/902), as will be discussed further below. Additionally, each device (110/112/114/120/225) may include an address/data bus (824/824) for conveying data among components of the respective device. Each component within a device (110/112/114/120/225) may also be directly connected to other components in addition to (or instead of) being connected to other components across the bus (824/824).

Referring to FIG. 8, the device 110/112/114 may include input/output device interfaces 802 that connect to a variety of components such as an audio output component such as a loudspeaker 812, a wired headset or a wireless headset (not illustrated), or other component capable of outputting audio. The device 110/112/114 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110/112/114 may additionally include a display 816 for displaying content. The device 110/112/114 may further include a camera 818.

Via antenna(s) 814, the input/output device interfaces 802 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device(s) 110/112/114, the system(s) 120, or the skill system(s) 225 may include their own dedicated processors, memory, and/or storage. Alternatively, one or more of the components of the device(s) 110/112/114, the system(s) 120, or the skill system(s) 225 may utilize the I/O interfaces (802/902), processor(s) (804/904), memory (806/906), and/or storage (808/908) of the device(s) 110/112/114 system(s) 120, or the skill system(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110/112/114, the system(s) 120, and the skill system(s) 225, as described herein, are illustrative, and may be located as a stand-alone device or may be included, in whole or in part, as a component of a larger device or system.

Figure 10:
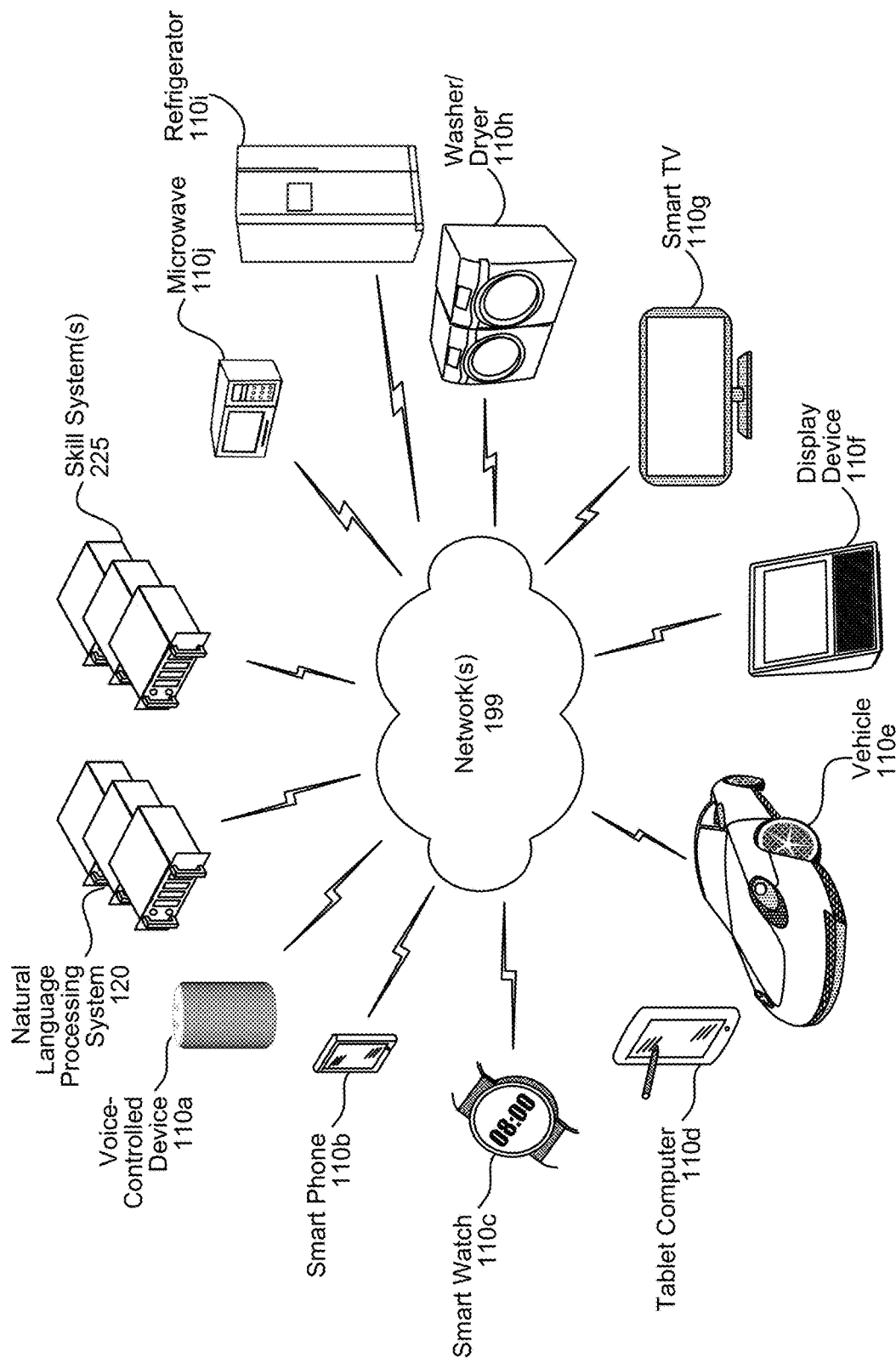
FIG. 10 illustrates a computer network for use with the system in accordance with embodiments of the present disclosure.

As illustrated in FIG. 10, multiple devices (110a-110j, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a toaster 110j may be connected to the network(s) 199 through a wireless service provider, over a WiFi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments. The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, from a developer device, first text data representing a first utterance to be used to invoke a first function to be supported by a natural-language processing system;
   processing the first text data to determine an intent corresponding to the first function;
   determining a confidence value representing a likelihood that the intent corresponds to the first text data;
   determining that the confidence value is greater than a threshold;
   determining, using the intent and first text data, training data representing a second function and second text data corresponding to a second utterance to be used to invoke a second function;
   determining a second value representing a predicted effect of training a component of the natural-language processing system using the training data;
   comparing the second value to a second threshold;
   after comparing the second value to the second threshold, causing a second device to display the first text data and the intent;
   receiving, from the second device, an indication that the intent corresponds to the first text data;
   training, using the first text data, the intent, and the training data, the component to determine an updated component configured to determine that the first text data corresponds to the first function;
   receiving, from a user device, audio data representing a third utterance;
   determining second text data corresponding to the audio data; and
   determining, using the updated component, that the second text data corresponds to the first function.

2. The computer-implemented method of claim 1, wherein determining the second value further comprises:
   determining that the component corresponds to a first number of a first plurality user devices;
   determining that the updated component corresponds to a second number of a second plurality of user devices;
   determining a difference value representing a difference between the first number and the second number; and
   comparing the difference value to a third threshold.

3. The computer-implemented method of claim 1, wherein determining the training data comprises:
   processing, using a sentence encoder, the first text data to determine a vector representing a first point in an embedding space;
   determining a second point in the embedding space;
   determining that a distance between the first point and the second point is less than a second threshold; and
   processing the second point to determine the second text data, wherein processing the second text data using the sentence encoder causes the sentence encoder to output the second point.

4. The computer-implemented method of claim 1, further comprising:
   determining a user account associated with the second utterance; and
   determining that the user account grants permission to process the second text data.

5. A computer-implemented method comprising:
   receiving, from a first device, first input data representing a first function and representing first data corresponding to an invocation of the first function;
   processing the first data using a trained model to determine annotation data corresponding to the first data;
   processing the first data to determine training data corresponding to the first function, the training data representing a second function and second data corresponding to an invocation of the second function;
   determining a value representing a predicted effect of processing, using the annotation data and the training data, a first component configured to determine that the second data corresponds to the second function;
   determining that the value satisfies a condition;
   after determining that the value satisfies a condition, causing a second device to display the first data and the annotation data;
   receiving, from the second device, an indication that the annotation data corresponds to the first data;
   determining, using the annotation data, training data, and the first component, a second component configured to determine that the first data corresponds to the first function; and
   determining, using the second component, that third data corresponds to the first function.

6. The computer-implemented method of claim 5, wherein determining the value further comprises at least one of:
   determining a degree of difference between the first component and the second component; or
   determining that a third function corresponds to the annotation data.

7. The computer-implemented method of claim 6, wherein determining the value comprises:
   determining that the annotation data corresponds to a third function;
   selecting fourth data corresponding to an invocation of the third function;

processing the fourth data using the annotation data to determine second annotation data corresponding to the fourth data; and determining, using the second annotation data and the second component, a third component configured to determine that the fourth data corresponds to the third function.

8. The computer-implemented method of claim 5, further comprising:

prior to determining the second component, determining a value corresponding to a likelihood of receiving the third data;

determining that the value satisfies a condition;

causing a second device to display the first data and the annotation data; and receiving, from the second device, an indication that the annotation data corresponds to the first data.

9. The computer-implemented method of claim 5, further comprising:

prior to determining the second component, determining a value corresponding to a confidence that the annotation data corresponds to the first data;

determining that the value satisfies a condition;

causing a second device to display the first data and the annotation data; and receiving, from the second device, an indication that the annotation data corresponds to the first data.

10. The computer-implemented method of claim 5, wherein processing the first data to determine the training data comprises:

processing the first data using an encoder to determine a first vector representing a first point in an embedding space;

determining, in the embedding space, a second vector representing a second point corresponding to the second data;

determining a difference between the first vector and the second vector; and determining that the difference satisfies a condition.

11. The computer-implemented method of claim 10, further comprising:

determining second annotation data corresponding to the second data;

determining, using the second annotation data and the second component, a third component configured to determine that the first data corresponds to the first function; and determining, using the third component, that third data corresponds to the first function.

12. The computer-implemented method of claim 5, wherein processing the first data to determine the training data comprises:

prior to processing the first input data using the training data, determining a user account associated with the second data; and determining that the user account includes an indication granting permission to process the second data.

13. A system comprising:

at least one processor; and at least one memory including instructions that, when executed by the at least one processor, cause the system to:

receive, from a first device, first input data representing a first function and representing first data corresponding to an invocation of the first function;

process the first data using a trained model to determine annotation data corresponding to the first data;

process the first data to determine training data corresponding to the first function, the training data comprising a second function and second data corresponding to an invocation of the second function;

determine a value representing a predicted effect of processing, using the annotation data and the training data, a first component configured to determine that the second data corresponds to the second function;

determine that the value satisfies a condition;

after determining that the value satisfies a condition, cause a second device to display the first data and the annotation data;

receive, from the second device, an indication that the annotation data corresponds to the first data;

determine, using the annotation data, training data, and the first component, a second component configured to determine that the first data corresponds to the first function; and determine, using the second component, that third data corresponds to the first function.

14. The system of claim 13, wherein the instructions that, when executed by the at least one processor, further cause the system to:

determine a degree of difference between the first component and the second component; or determine that a third function corresponds to the annotation data.

15. The system of claim 14, wherein the instructions that, when executed by the at least one processor, further cause the system to:

determine that the annotation data corresponds to a third function;

select fourth data corresponding to an invocation of the third function;

process the fourth data using the annotation data to determine second annotation data corresponding to the fourth data; and determine, using the second annotation data and the second component, a third component configured to determine that the fourth data corresponds to the third function.

16. The system of claim 13, wherein the instructions that, when executed by the at least one processor, further cause the system to:

prior to determining the second component, determine a value corresponding to a likelihood of receiving the third data;

determine that the value satisfies a condition;

cause a second device to display the first data and the annotation data; and receive, from the second device, an indication that the annotation data corresponds to the first data.

17. The system of claim 13, wherein the instructions that, when executed by the at least one processor, further cause the system to:

prior to determining the second component, determine a value corresponding to a confidence that the annotation data corresponds to the first data;

determine that the value satisfies a condition;

cause a second device to display the first data and the annotation data; and receive, from the second device, an indication that the annotation data corresponds to the first data.

18. The system of claim 13, wherein the instructions that, when executed by the at least one processor, further cause the system to:

process the first data using an encoder to determine a first vector representing a first point in an embedding space;

determine, in the embedding space, a second vector representing a second point corresponding to the second data;

determine a difference between the first vector and the second vector; and determine that the difference satisfies a condition.

19. The system of claim 13, wherein the instructions that, when executed by the at least one processor, further cause the system to:

determine second annotation data corresponding to the second data;

determine, using the second annotation data and the second component, a third component configured to determine that the first data corresponds to the first function; and determine, using the third component, that third data corresponds to the first function.

20. The system of claim 13, wherein the instructions that, when executed by the at least one processor, further cause the system to:

prior to processing the first input data using the training data, determine a user account associated with the second data; and determine that the user account includes an indication granting permission to process the second data.

* * * * *